(12) United States Patent
Han et al.

(10) Patent No.: US 6,442,772 B2
(45) Date of Patent: Sep. 3, 2002

(54) ADVANCED DUAL-FLUSH VALVE

(75) Inventors: Joseph Han, Irvine; John McKay, Placentia; Tracy James Haggstrom, Orange; Farid Maiwandi, Laguna Hills, all of CA (US)

(73) Assignee: Fluidmaster, Inc., San Juan Capistrano, CA (US)

( * ) Notice: Subject to any disclaimer, the term of this patent is extended or adjusted under 35 U.S.C. 154(b) by 0 days.

(21) Appl. No.: 09/818,451

(22) Filed: Mar. 26, 2001

Related U.S. Application Data

(63) Continuation-in-part of application No. PCT/US99/21057, filed on Sep. 14, 1999, which is a continuation of application No. 09/152,749, filed on Sep. 14, 1998, now Pat. No. 6,081,938.

(51) Int. Cl.[7] .................................................. E03D 1/14
(52) U.S. Cl. .............................................. 4/325; 4/410
(58) Field of Search ............................. 4/324, 325, 410

(56) References Cited

U.S. PATENT DOCUMENTS

| | | |
|---|---|---|
| 1,497,796 A | 6/1924 | Sherwood |
| 1,571,604 A | 2/1926 | Ryan |
| 1,787,601 A | 1/1931 | Swanberg |
| 1,901,633 A | 3/1933 | Clemmons |
| 2,017,799 A | 10/1935 | Helfrich .................... 137/104 |
| 2,105,314 A | 1/1938 | Duncan et al. ............. 137/104 |
| 2,283,945 A | 5/1942 | Peterson et al. ........... 137/104 |
| 2,738,851 A | 3/1956 | Warch ......................... 181/49 |
| 3,096,068 A | 7/1963 | Claridge et al. ............ 251/118 |
| 3,516,094 A | 6/1970 | Reagan .......................... 4/41 |
| 3,669,138 A | 6/1972 | Schoepe et al. ............ 137/218 |
| 3,930,516 A | 1/1976 | Flinner et al. .............. 137/215 |
| 4,108,202 A | 8/1978 | Schoepe ..................... 137/436 |
| 4,338,964 A | 7/1982 | Schoepe ..................... 137/436 |
| 4,566,140 A | 1/1986 | Musgrove ...................... 4/324 |
| 4,600,031 A | 7/1986 | Nestich ...................... 137/218 |
| 5,265,282 A | * 11/1993 | Schmuchi et al. ............. 4/325 |
| 5,280,803 A | 1/1994 | Swift et al. ................. 137/414 |
| 5,659,903 A | * 8/1997 | Hammarstedt ................. 4/325 |
| 5,738,141 A | 4/1998 | Blanke et al. .............. 137/414 |
| 6,163,897 A | * 12/2000 | Plas et al. ..................... 4/410 |

FOREIGN PATENT DOCUMENTS

GB 400810 11/1933

* cited by examiner

*Primary Examiner*—Charles E. Phillips
(74) *Attorney, Agent, or Firm*—Richard L. Myers; Myers, Dawes & Andras LLP

(57) ABSTRACT

A flush valve is adapted to be mounted in the tank of a toilet and includes a selector assembly and a flush valve. The selector assembly is accessible from outside the toilet and provides for initiation of the flushing operation and an alternative choice between a larger flush water volume and a smaller flush water volume. A support structure provides for both axial and radial movement of the selector assembly relative to the flush valve in order to facilitate mounting and aligning of the flush valve assembly. A slide mechanism provides for variation of at least the smaller flush water volume.

21 Claims, 21 Drawing Sheets

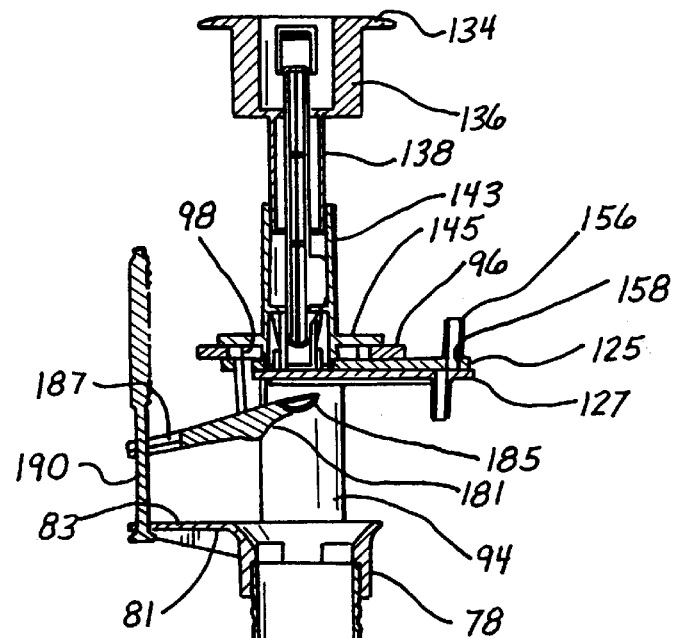
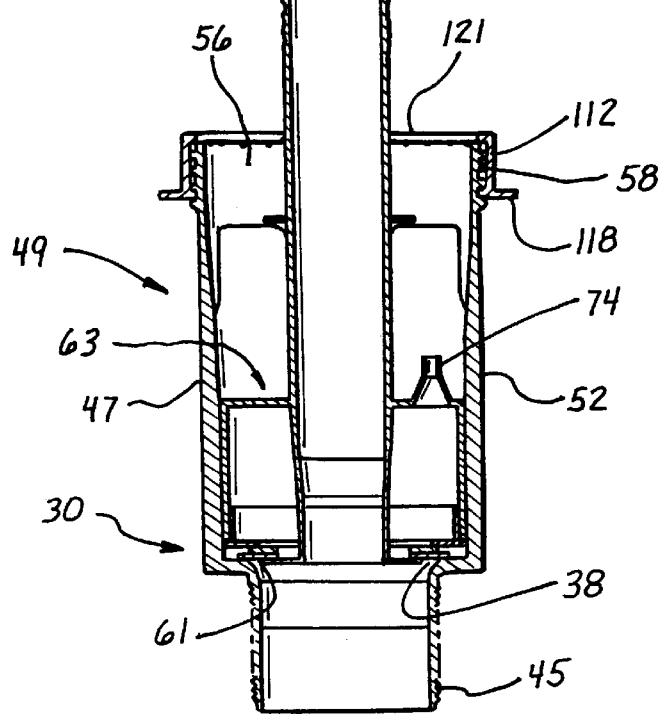
FIG. 7

ADVANCED DUAL-FLUSH VALVE

CROSS REFERENCE TO RELATED APPLICATIONS

This application is a continuation-in-part of International Application Serial No. PCT/US99/21057, filed Sep. 14, 1999, which is a continuation of U.S. application Ser. No. 09/152,749, filed Sept. 14, 1998 now U.S. Pat. No. 6,081,938.

BACKGROUND OF THE INVENTION

1. Field of the Invention

This invention relates generally to toilet flush valves and, more specifically, to valves providing alternative flush water volumes.

2. Discussion of the Prior Art

Toilets typically include a bowl which is adapted to receive liquid and solid waste, and a tank which provides a reservoir of water for flushing the waste from the bowl. Apparatus which is commonly mounted in the tank includes a flush valve assembly which is operable by the user to initiate the flushing of the bowl. A fill valve is also commonly mounted in the tank to refill the tank with a predetermined amount of water to be used in the next flushing operation.

Flush valve assemblies can vary considerably in their complexity, but typically include a flush valve, a float and an actuation mechanism. By operation of the actuation mechanism, the flush valve opens to release water from the tank into the bowl and closes when the float reaches a predetermined level indicative of the amount of water left in the tank.

More complex flush valve assemblies, such as that disclosed in PCT application number WO9502738 provide alternative flush water volumes. Prior to initiating the flushing operation, the user chooses between a large flush water volume for solid waste, and a smaller flush water volume for liquid waste. In the past, this selection has been made by a mechanical switch assessible to the user from outside the tank. Once the selection has been made, the associated flushing operation is initiated by operation of a pull tab also assessible from outside the tank.

These dual-flush toilet valves commonly include a selection apparatus which is mounted to the top of the tank, and a flush valve which is mounted to the bottom of the tank. With this design it is often desirable to adjust the axial distance separating the flush valve and the selection apparatus in order to accommodate tanks of various heights. In the past, this axial adjustability was provided by a shaft extending from the selector apparatus downwardly toward the flush valve. The length of this shaft had to be determined and the shaft cut to accommodate a particular height of the tank. This was a cumbersome procedure which had to be carried out with each installation. Unfortunately, once the shaft was cut, the valve assembly was rendered useless for taller toilet tanks. Mounting has also been a problem in tanks having mounting holes slightly misaligned. There has been no radial adjustability in prior flush valves to accommodate these toilets.

Within the tank, a hollow float has been provided with a water inlet and an air outlet. Selection of the reduced flush water volume has provided a controlled release of air from the air outlet to atmospheric pressure. This structure has facilitated the passage of water into the hollow float thereby decreasing the buoyancy of the float during the flushing operation and prematurely closing the flush valve.

U.S. Pat. No. 5,228,144 discloses a structure for adjusting the flush volume by controlling a release of air from the hollow float into a pressure tube which extends into the water in the tank. This tube provides a variable pressure that is dependent upon the level of the water in the tank. By adjusting the level of the tube in the tank, the pressure can be varied to provide a predetermined but adjustable flush water volume.

SUMMARY OF THE INVENTION

In accordance with the present invention, a flush valve assembly is provided with a selector apparatus including multiply actuators, such as buttons, which not only initiate the flushing procedure, but also choose between alternative flush water volumes. The step for initiating the flushing operation and for selecting the desired flush volume occurs substantially simultaneously with the single push of the associated button.

For the reduced flush volume, the float can be vented through a slide assembly and into a tube having a variable pressure dependent of the depth of the tube in the water. This will provide the reduced flush volume with a predetermined variable volume.

The slide associated with the air vent includes a first planar member having an aperture in fluid communication with the hollow float. A second slide member has a second aperture which is between first and second positions associated with the first and second flush water volumes. Movement of the second slide member is dependent upon operation of two flush actuators. The first flush actuator initiates the first flush with the lesser volume dependent upon the position of the pressure tube, while the second actuator initiates the flushing operation with the greater second flush volume.

The axial dimension of the flush valve assembly is adjustable using mating ridges and a retainer ring. This adjustment structure provides a variable distance between the flush valve and a lever associated with the selection apparatus. The shaft extending from the actuators to the lever is provided with a consent length and need not be cut to fit the assembly to the particular height of the tank. Radial adjustment of the selection apparatus relative to the flush valves accommodates toilets having mounting holes which are slightly misaligned.

In a first aspect of the invention, a toilet includes a bowl adapted to receive waste to be flushed, and a tank providing a reservoir of water to flush the bowl. A flush valve assembly is disposed in the tank and operable to release the water into the bowl in a first volume associated with the flushing of liquid waste and a second volume greater than the first volume associated with the flushing of solid waste. A selector apparatus is included in the flush valve assembly and accessible from outside the tank for initiating a flushing operation and for selecting one of the first flush volume and the second flush volume. A flush valve included in the flush assembly is responsive to operation of the selector assembly to release the water into the bowl. The flush valve is responsive to operation of the selector apparatus to select the first flush volume by opening the flush valve at the beginning of a first time period associated with the first flush volume and by closing the flush valve at the end of the first time period. Similarly, the flush valve is responsive to operation of the selector apparatus to select the second flush volume by opening the flush valve at the beginning of a second time period associated with the second flush volume and closing the flush valve at the end of the second time period. In this aspect of the invention, the second time period is greater than the first time period and the first time period is variable to adjust the first flush volume. A float having a least one wall forming a hollow chamber includes first portions of the wall defining at least one water inlet for receiving water at a first water entry rate associated with the first flush volume, and a second water entry rate associated with the second flush volume. Second portions of the wall define at least one air outlet hole for releasing air from the hollow chamber at a first air release rate associated with the first water entry rate, and a second air release rate associated with the second water entry rate.

In another aspect of the invention, a flush valve assembly is adapted to be mounted in a toilet tank having a top and a bottom, to controllably release water from the tank to flush the toilet. The flush valve assembly includes a flush valve coupled to a first column, and a selector assembly coupled to a second column. One of the first and second columns includes the plurality of first ridges while the other column includes at least one second ridge mating with the first ridge in a plurality of patterns each providing a different spaced relationship between the flush valve and the selector assembly. A retainer is disposed around the first and second columns to maintain the first ridges and the second ridge in a predetermined one of the mating patterns.

In another aspect of the invention, the flush valve assembly extends generally along an axis and is adapted for mounting in a toilet tank having a top and a bottom, to controllably release water from the tank to flush the toilet. The assembly includes a flush valve adapted to be mounted at the bottom of the tank and a selector assembly disposed at the top of the tank. A first push button is included in a selector assembly and to operate the flush valve to release a first volume of the water from the tank. A second push button, also included in the selector assembly, is to operate the flush valve to release a second volume of the water from the tank. The second volume of water is different from the first volume of water. In this aspect, a slide is by operation of the first push button to a first position associated with the first volume of the water and is by operation of the second push button to a second position associated with the second volume of water. The first and second push buttons are adapted to be pushed axially while the slide is generally transverse to the axis between the first position and second position.

In a further aspect of the invention, a method for flushing a toilet to alternatively initiate a flushing operation with a first flush water volume and a second flush water volume, includes the step of providing a selector apparatus having a first actuator and a second actuator. Operation of the first actuator initiates the flushing operation with the first flush volume while operation of the second actuator initiates the flushing operation with the second flush water volume. This operation includes the steps of initiating the flushing operation by pushing a first button, and selecting the first flush volume by pushing the first button. These initiating and selecting steps occur substantially simultaneously.

In still a further aspect of the invention, a toilet flush valve includes a top section having an axis, and at least two support members each extending in a generally parallel relationship to the axis. A plurality of projections carried by at least one of the support members extend inwardly toward the axis. A bottom section of the flush valve includes a plurality of annular flanges sized and configured to receive the projections of the top section. A retention ring is between an adjustment position and a locking position. In the adjustment position the projections are removed from the flanges, but in the locking position, the projections are held in a fixed relationship with the flanges providing the flush valve with a predetermined height.

A method for adjusting the height of a toilet flush mechanism provides a further aspect of the invention. This method includes the step of providing a top section with at least one support member having a plurality of projections extending radially inwardly. A bottom section is provided with a cylindrical portion defining a plurality of annular flanges configured to receive the projections of the top section. These flanges defined with the cylindrical portion a geometric section extending axially along the cylindrical portion. A locking ring can be moved along the support member of the top section, and provided with at least one tab engaging the projections of the support member at a predetermined location dependent on the desired height of the toilet flush mechanism. The method of adjustment includes the steps of sliding the support member along the geometric section, and rotating the top section and the ring relative to the bottom section to engage the flanges with the projections in order to maintain the flush valve mechanism at the desired height.

These and other features and advantages of the invention will become more apparent with a description of preferred embodiments and reference to the associated drawings.

DESCRIPTION OF THE DRAWINGS

FIG. 7 is an axial cross-section view taken along lines 7—7 of FIG. 5;

FIG. 19b is an axial cross-section view taken along lines 19b—19b of FIG. 19a;

DESCRIPTION OF THE PREFERRED EMBODIMENTS AND BEST MODE OF THE INVENTION

Figure 1:
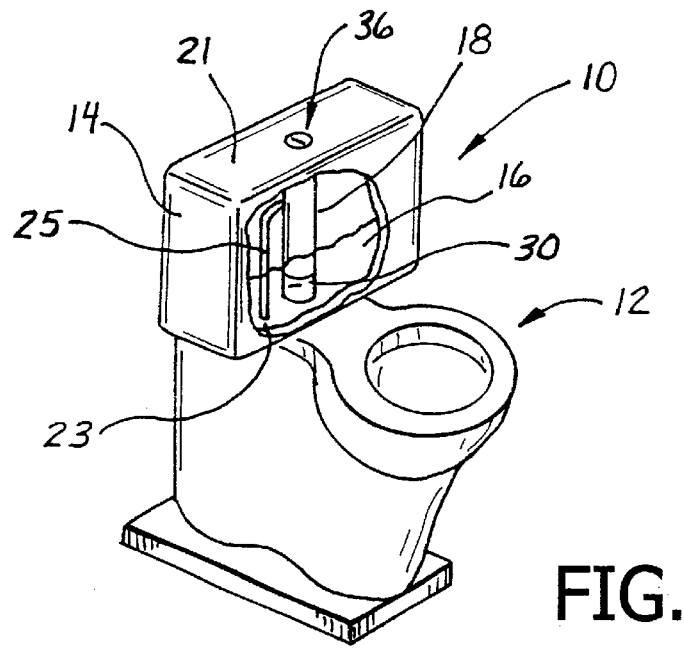
FIG. 1 is a perspective view of a toilet partially in phantom to illustrate a flush valve assembly of the present invention mounted in the tank of the toilet.

A toilet is illustrated in FIG. 1 and designated generally by the reference numeral 10. The toilet 10 includes a bowl 12 which is adapted to receive liquid and solid waste. A tank 14 is typically mounted above the bowl 12 and forms a reservoir for water 16 used to flush the bowl 12. A flush valve assembly 18 is mounted between a top 21 and a bottom 23 of the tank 14. The flush valve assembly 18 includes a pressure tube 25 which extends into the water 16 as described in greater detail below.

Figure 2:
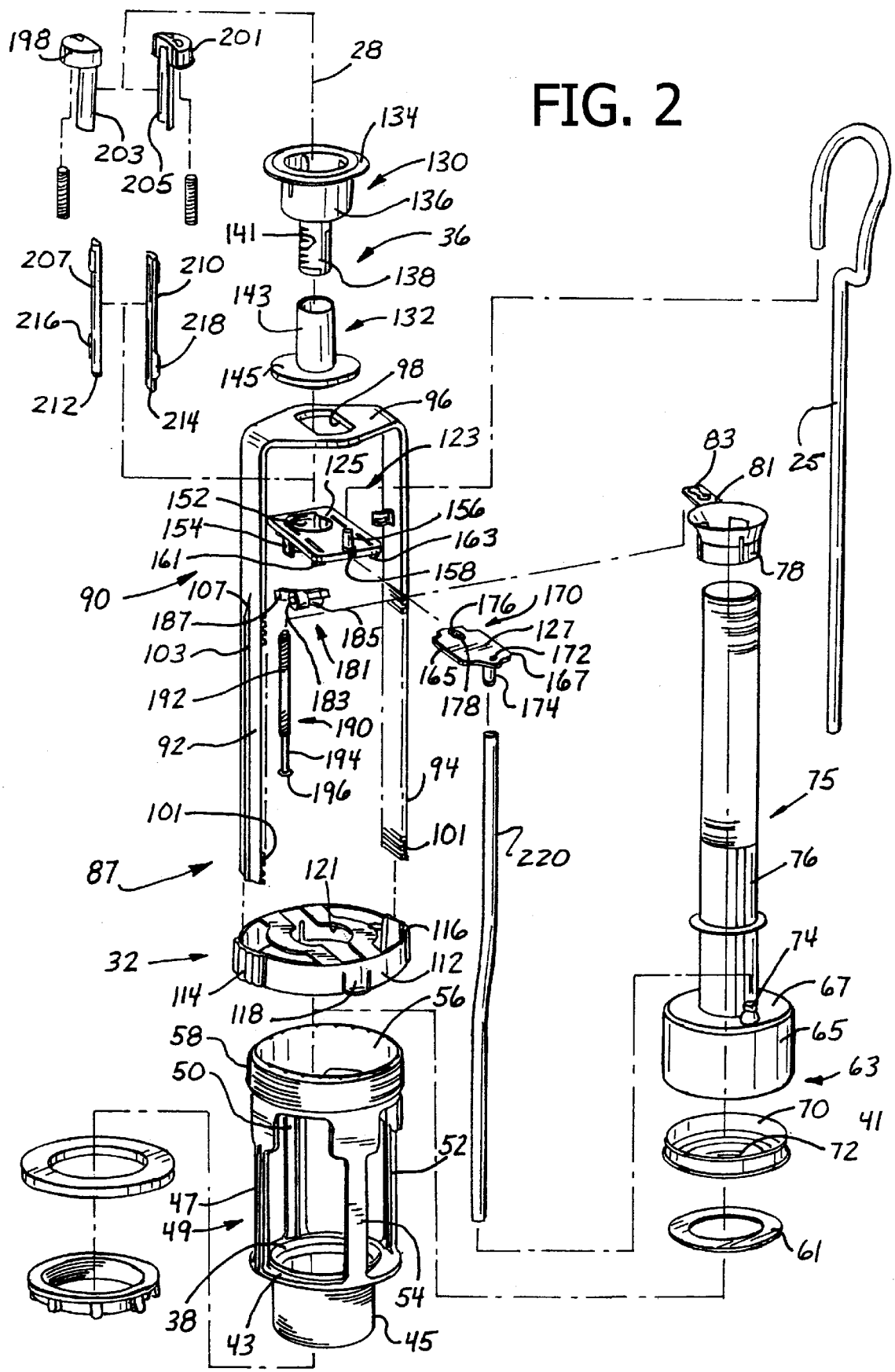
FIG. 2 is an assembly perspective view illustrating various components of the flush valve assembly of a preferred embodiment.
Figure 3:
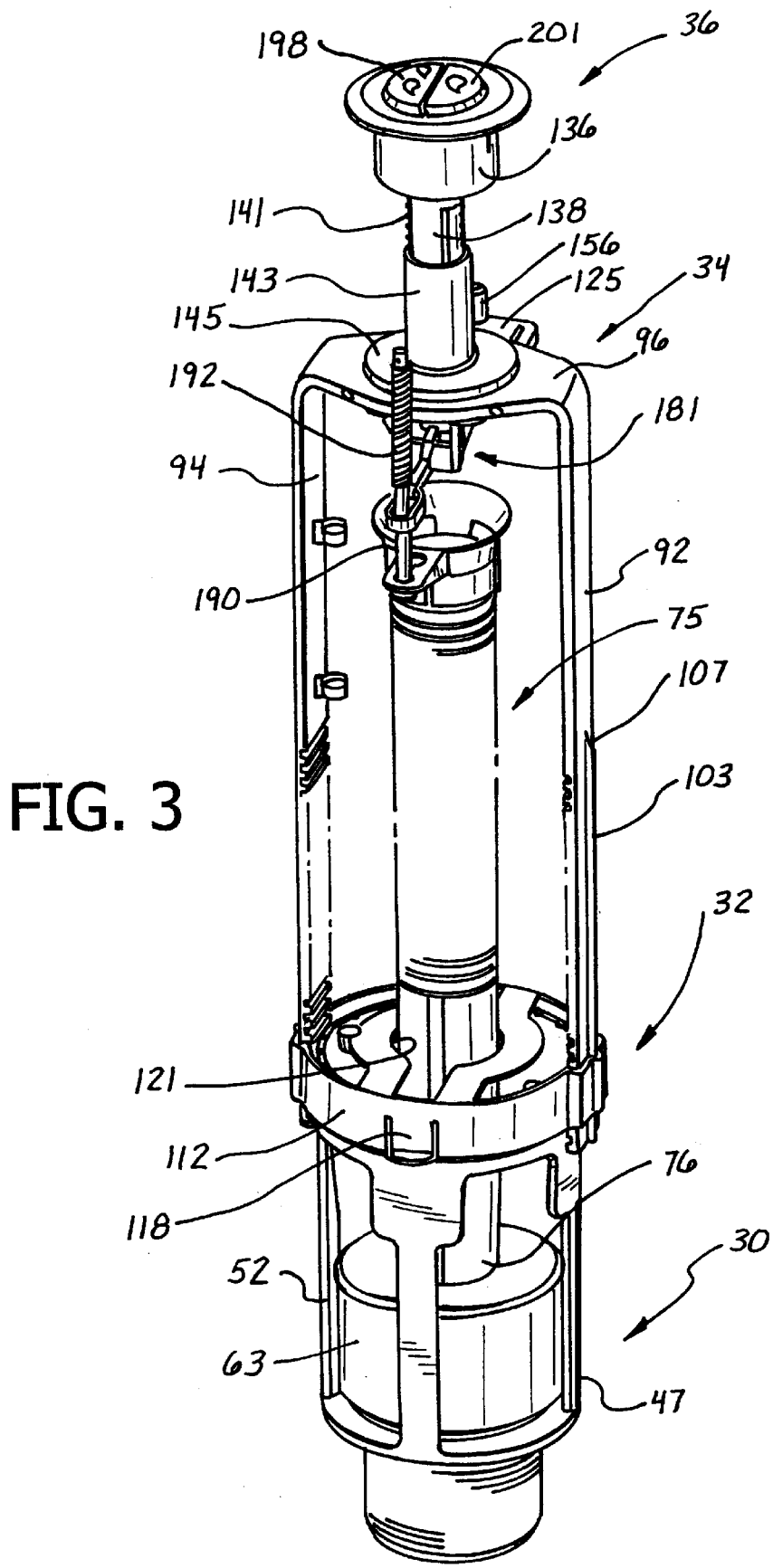
FIG. 3 is a front perspective view of the flush valve assembly of FIG. 2.
Figure 4:
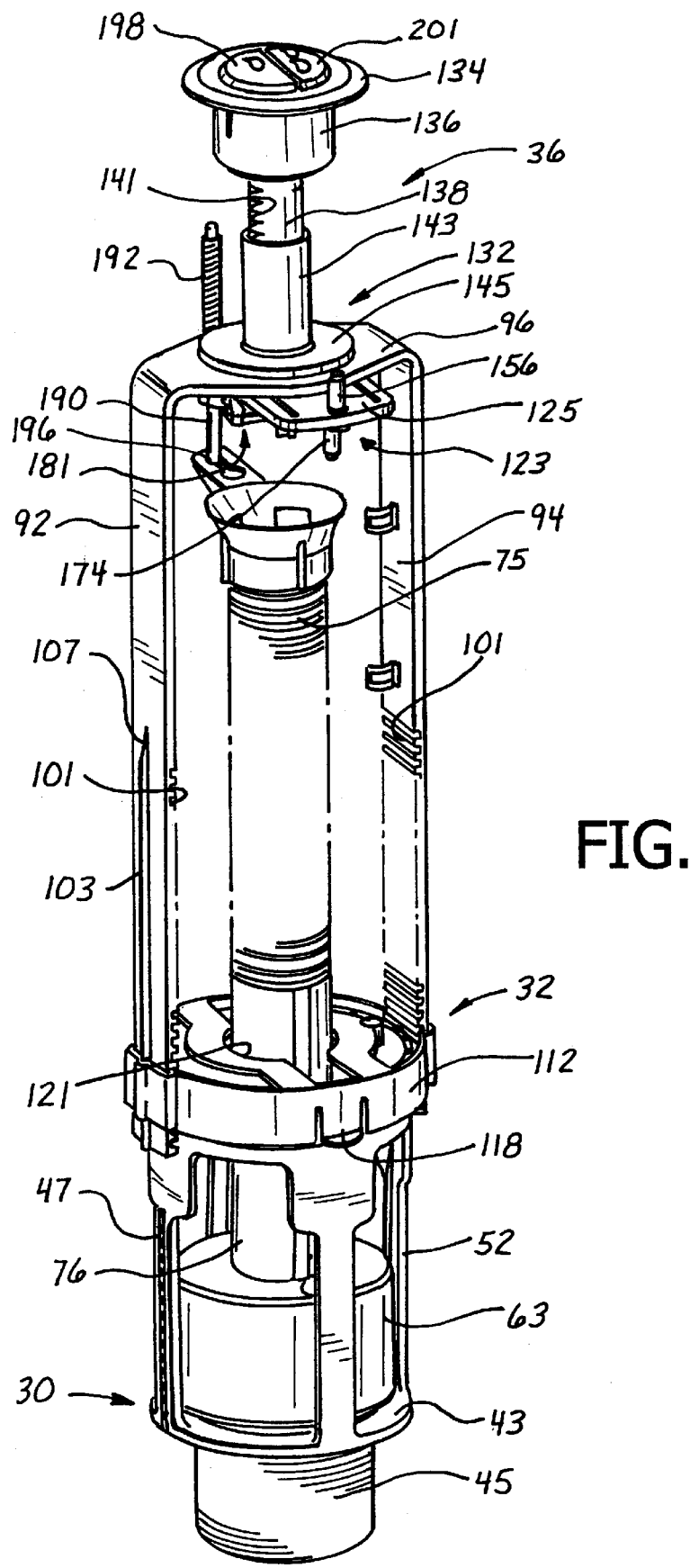
FIG. 4 is a back perspective view of the flush valve assembly of FIG. 2.
Figure 5:
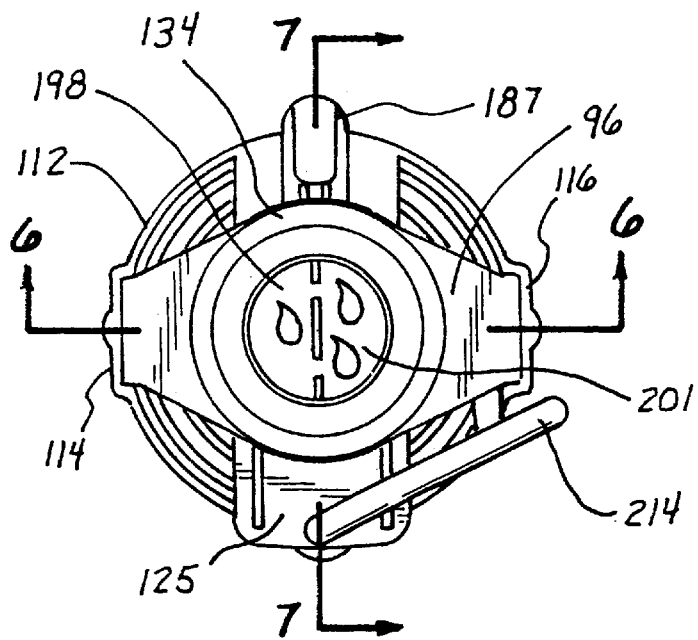
FIG. 5 is a top plan view of the FIG. 2 embodiment.
Figure 8:
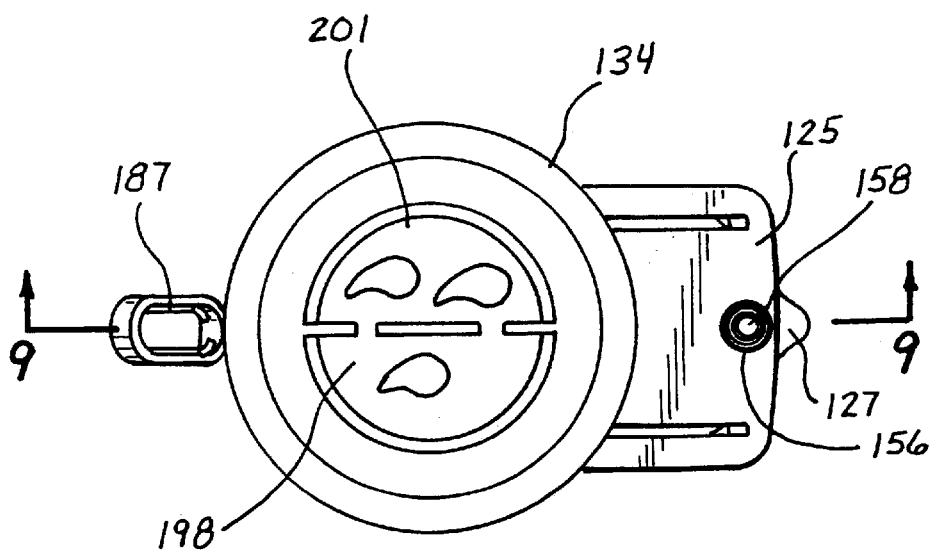
FIG. 8 is a top plan view of slide mechanism associated with the FIG. 2 embodiment.

An exploded view of the flush valve assembly is illustrated in FIG. 2 with assembled views presented in FIGS. 3 and 4. From these views, it can be seen that the flush valve assembly 18 of a preferred embodiment has an axis 28 and includes generally a flush valve 30, an axial adjustment structure 32, a slide mechanism 34, and a selector assembly 36. In operation, the flush valve 30 releases water from the tank 14 into the bowl 12 in response to the operation of the selector assembly 36. Depending upon the operation of the selector assembly 36, the slide mechanism 34 produces a flush water volume which is selectable between a small variable volume, intended to flush liquid waste, and a larger fixed volume, intended to flush solid waste. The axial structure 32 enables the flush valve assembly 18 to be adjusted for mounting in tanks, such as the tank 14, having different distances separating the top 21 and the bottom 23.

As best illustrated in FIG. 2, the flush valve 30 includes a valve seat 38 which is formed in a base 49 and a valve element illustrated generally at 41. The valve seat is formed in a ring 43 which is mounted to the bottom 23 of the tank 14 by an exteriorly threaded pipe 45. Integral with the ring 43 and extending upwardly from the bottom 23 of the tank 14 are a plurality of columns 47, 50, 52 and 54 which extend toward the selector assembly 36 and support a coaxial cylinder 56 having circumferential ridges 58. These ridges 58 are disposed to extend on the columns 47, 50, 52 and 54 generally transverse, such as perpendicular, to the axis 28.

In this particular embodiment, the valve element 41 comprises an elastomeric washer 61 which is mounted to a hollow float 63 having a circumferential wall 65 extending between a top wall 67 and a bottom wall 70. In this case, the bottom wall 70 forms a water inlet aperture 72 while the top wall 67 forms an air outlet aperture 74. The float 63 is integral with an overflow spout including an upstanding tube 76 and a flared top ring 78 having a radial flange 81 with an aperture 83. The top ring 78 can be adhered to the tube 76 or otherwise disposed in a fixed relationship with the tube 76. In a preferred embodiment, the flange 81 extends radially on a side of the tube 76 opposite to the aperture 74 associated with the float 63.

A top member 90 forms with the base 49 a support structure 87 which maintains the selector assembly 36 in a spaced relationship with the flush valve 30. This spaced relationship is adjustable in a preferred embodiment by operation of the axial adjustment structure 32.

In the illustrated embodiment, the top member 90 is formed with columns 92 and 94 which extend axially from a connecting flange 96 having a slot 98. A plurality of ridges 101 are formed on the inner surfaces of the columns 92 and 94. These ridges 101 are sized and configured to mate with the ridges 58 on the base 49 in a plurality of patterns which provide different distances of separation between the flush valve 30 and the selector assembly 36. Radial flanges 103 and 105 extend longitudinally along the outer surfaces of the associated columns 92 and 94. These flanges 103 and 105 terminate at flange ends 107, respectively, short of the connecting flange 96.

The axial adjustment structure 32 also includes a retainer 112 which functions to hold the ridges 101 of the columns 92 and 94 in a preferred mating relationship with the ridges 58 of the base 49. This retainer 112 in a preferred embodiment is in the form of a ring and is provided with circumferential slots 114 and 116 which are shaped to receive the respective columns 92 and 94 and the associated longitudinally flanges 103 and 105. The circumference of the retainer ring 112 can also be provided with bendable detente tabs 118 which are engageable with the ridges 58 to maintain the retainer 112 in its preferred operative disposition. Portions of the retainer 112 define a central aperture 121 which is sized to receive the spout 75 associated with the float 63.

In its operative disposition, the retainer 112 encircles the columns 92 and 94 as well as the base 49 circumferentially of the ridges 58. Adjustment of the axial length of the support structure 92 is accomplished by bending the retainer tabs 118 outwardly to free the retainer from the ridges 58. The retainer 112 can then be moved upwardly along the columns 92 and 94 preferably beyond the flange ends 107 and 109. The columns 92 and 94 can then be bent outwardly to remove the ridges 101 of the top member 90 from the ridges 58 of the base 49. This permits the top member 90 to be moved axially relative to the base 49 thereby providing an adjustment in the axial length of the support structure 92. When the ridges 101 have been formed in a new pattern with respect to the ridges 58, the retainer 112 can be lowered to its operative position to maintain the predetermined length of the support structure 92.

In a preferred embodiment, the ridges 58 associated with the base 40 are formed as separate concentric circles having a generally parallel relationship. The ridges 101 associated with the columns 92 and 94 are similarly formed as discrete parallel flanges spaced to mate with the ridges 58. This configuration permits the top member 90 to be rotated relative to the base 49 thereby facilitating alignment of the flush valve assembly 18. This alignment is further facilitated by the selector assembly 36 which is snap-fit through the slot 98 of the flange 96, into a slide subassembly 123 which includes a base 125 and a slide element 127. Neither the selector assembly 36 nor the slide subassembly 123 are fixed to the flange 96 of the top member 90. This, coupled with the fact that the structure extending through the slot 98 is smaller than the slot 98, ensures that the resulting combination of the selector assembly 36 and the slide assembly 123 is radially with respect to the flange 96. Alignment of the flush valve assembly 18 is thus facilitated for those toilets which have mounting holes in the top 21 and bottom 23 which are slightly misaligned. By rotating the top member 90 relative to the base 49 and/or sliding the selector assembly 36 relative to the flange 96, the flush valve assembly 18 can be easily mounted in any tank such as the tank 14.

Figure 9:
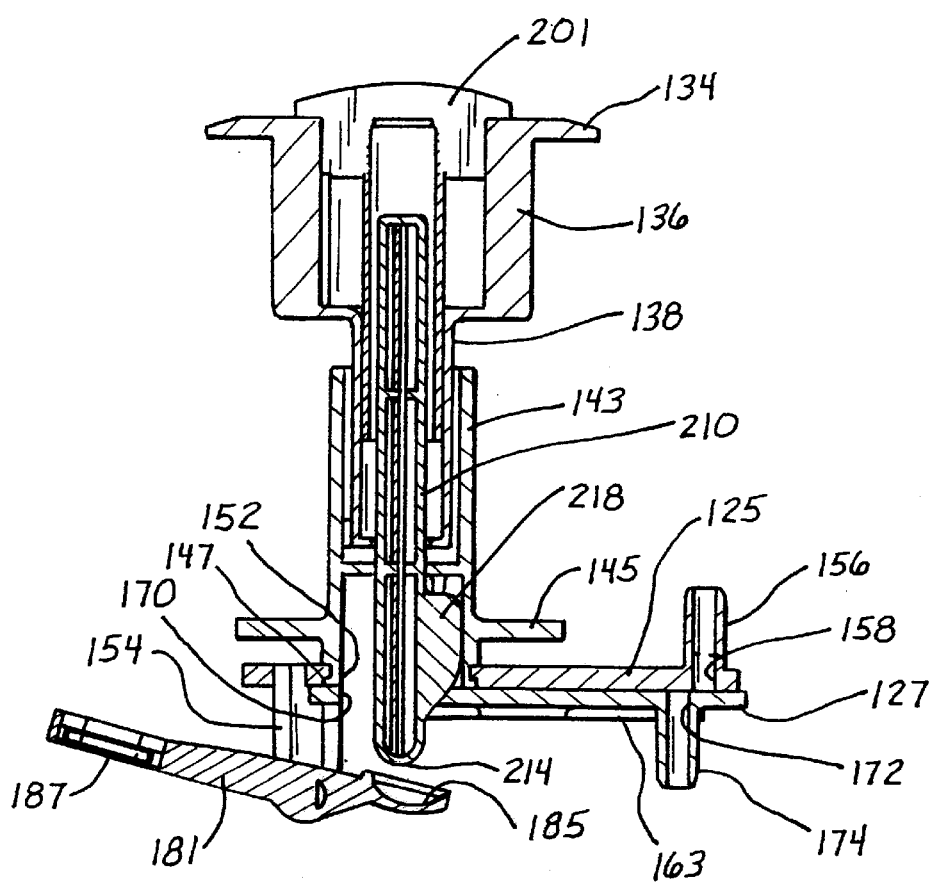
FIG. 9 is an axial cross-section view of the slide mechanism taken along lines 9—9 of FIG. 8.
Figure 6:
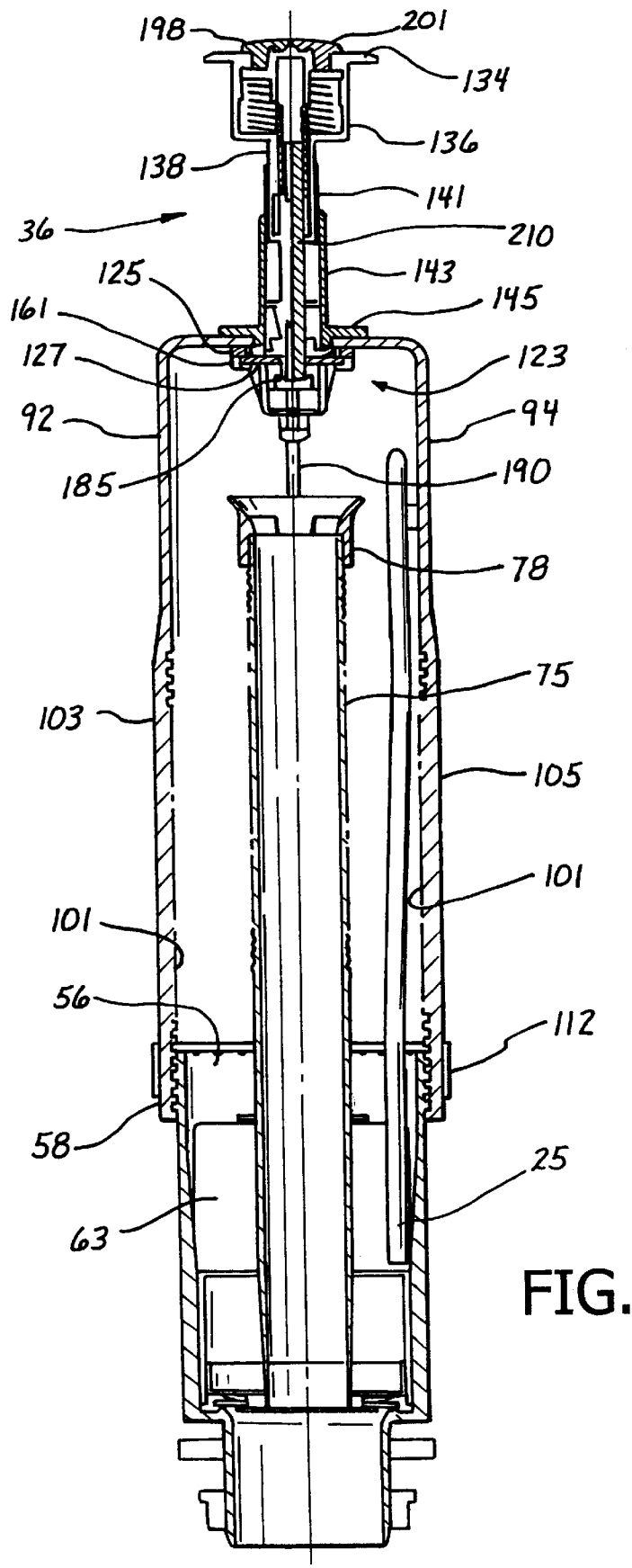
FIG. 6 is an axial cross-section view taken along lines 6—6 of FIG. 5.

The selector assembly 36 is perhaps best illustrated in the cross-section views of FIGS. 6 and 7 and the enlarged view of the FIG. 9. From these views it can be seen that a preferred embodiment of the assembly 36 includes a top housing member 130 and a bottom housing member 132. The top housing member 130 includes an upper flange 134 which seats against the top surface of the top 21 of the tank 14. A cylinder 136 is sized to extend through a hole in the top 21 and to terminate in a cylindrical guide tube 138.

The exterior surface of the guide tube 138 is provided with a bayonet structure 141 which engages opposing elements on a cylinder 143 associated with the bottom housing element 132. This bottom element 132 terminates in a flange 145. A cylindrical snap 147 can be provided beneath the flange 145 to engage a hole 152 in the base 125 of the slide subassembly 123. This base 25 can be provided with a generally flat configuration and oriented in a plane perpendicular to the axis 28 of the flush valve assembly 18. A pair of pivot flanges 154 extend from the bottom side of the base 125, and a tube 156 extends from the top side of the base 125 in fluid communication with a hole 158 through the base 125. The base 125 is also provided with a pair of guides 161, 163 which are oriented to receive opposing sides 165 and 167 of the slide 127.

Portions of the slide 127 include a slot 170 and a hole 172 which opens into a downwardly extending tube 174. The slot 170 is formed in part by a pair of opposing surfaces 176 and 178 which are oriented generally perpendicular to the guides 161, 163 and associated edges 165, 167. The slot 170 with its surfaces 176 and 178 is intended to be accessible through the hole 152 of the base 125.

In the illustrated embodiment a lever 181 is mounted to pivot on fulcrum pins 183 which engage the pivot flanges 154 of the base 125. On opposite sides of the pin 183, the lever 181 is formed with an upwardly facing cup 185 and an internally threaded nut 187. A pin 190 is provided with external threads 192 which engage the nut 187, and a shaft 194 which extends through the aperture 83 of the flange 81 and terminates in an enlargement 196. In a manner discussed in greater detail below, it will be apparent that this structure responds to a downward force against the cup 185 by lifting the pin 190 and the spout 75 thereby raising the float 63 and opening the flush valve 30 at the tank bottom 23 (FIG. 1).

In addition to the housing elements 130, 132, the selector assembly 36 includes a pair of actuators which in this embodiment are formed as pushbuttons 198 and 201 each have a semi-circular configuration. These buttons 198 and 201 are sized to fit within the cylinder 136 and are exposed at the tank top 21. The push buttons 198 and 201 have semi-cylindrical projections 203 and 205 respectively which extend into the guide tube 138. These projections 203 and 205 are adapted to receive associated half-shafts 207 and 210.

The half-shafts 207 and 210, which extend to respective ends 212 and 220, include associated flanges 216 and 218 which extend radially in opposite directions. The half-shafts 207, 210 are preferably of a length sufficient that the ends 212 and 220 engage the cup 185 of the lever 181 with the flanges 216 and 218 extending through to the hole 152 in the base 125 and the slot 170 in the slide 127.

In operation, a person will alternatively actuate either the push button 198 or the push button 201. In either case, the associated half-shaft 207 or 210 will be moved axially downwardly until the associated shaft end 212 or 219 applies a downward force against the cup 185. In the manner previously discussed, this will initiate the flushing operation by lifting the float 63 and opening the flush valve 30. Thus, with a single flushing movement, such as the pushing of one of the buttons 198 and 201 in a single direction, the flushing operation can be initiated and the selection of flush volume determined generally simultaneously.

The remaining structure associated with this particular embodiment of the flush valve 18 controls the duration of the flushing operation which is completed when the float 63 moves downwardly to close the flush valve 30. Increasing the duration of the flushing operation, for example by depressing the push button 201, will result in a greater flush water volume for flushing solid waste. Alternatively, decreasing the duration of the flushing operation, for example by depressing the push button 198, will result in a reduced flush water volume for flushing liquid waste.

This remaining structure includes a flexible tube 220 which connects the tube 174 of the slide 127 with the air outlet aperture 74 associated with the float 63. A second tube, designated by the reference numeral 25 in FIG. 1, extends into the water 18 in the tank 14 a distance which is adjustable to vary the pressure in the tube 25. This pressure tube 25 is connected to the tube 156 associated with the base 125 of the slide assembly 123. It is the purpose of these tubes 220 and 25 to respond to operation of the push button 198 by bleeding air from the float 63 thereby reducing the buoyancy of the float 63 and causing it to prematurely drop and close the flush valve 30. Reducing the buoyancy of the float 63, results in a shorter flushing period and a smaller flush water volume. Alternatively, operation of the push button 201 is intended to block the tubes 220 and 25 at the slide assembly 123 so that the buoyancy of the float 63 is not reduced thereby resulting in an extended flushing period and a larger flush water volume.

This opening and closing of the tubes 220 and 25 is achieved by the slide assembly 123. As the push button 198 is depressed, its associated half-shaft 207 not only initiates the flushing operation through the pivot 181, but also results in the flange 216 engaging the surface 176 of the slot 170 in the slide 127. This moves the slide 127 relative to the base 125 to a first position where the associated holes 172 and 158 are aligned thereby providing fluid communication between the tube 220 and the pressure tube 25. In the manner previously mentioned, this facilitates venting of air from the float 63 and results in a shorter flushing period.

Alternatively, if the push button 201 is depressed, its associated half-shaft 210 moves downwardly not only to initiate the flushing operation through the lever 181, but also to bring the flange 218 into engagement with the surface 178 of the slot 170. This moves the slide 127 relative to the base 125 to a second position where the associated holes 172 and 158 are not aligned as illustrated in FIG. 7. This results in blocking fluid communication between the tube 220 and the tube 25 thereby preventing the bleeding of air from the float 63. The float 63 remains fully buoyant extending the period of the flushing operation and resulting in a higher flush water volume.

The resulting structure not only provides for two different flush volumes, but also provides for variation or adjustment of the lesser flush volume. This results from varying the pressure within the pressure tube 25 so that when it is in fluid communication with the tube 220, air is bled from the float 63 at an adjustable rate. This pressure in the tube 25 is controlled by varying the distance that the tube 25 extends into the water 18 in the tank 14. When the tube 25 is adjusted to extend a greater distance into the water 18, its pressure increases thereby reducing the rate of air release from the float 63. With a decrease in this rate of air flow, the buoyancy of the float 63 is reduced over a longer period of time resulting in a longer flushing period and a greater flush water volume.

The resulting structure of the flush valve assembly 18 of this embodiment provides for simplified mounting of the assembly 18 by facilitating axial adjustment through the structure 32 and radial alignment of the selector assembly 36 relative to the slot 98. A flushing operation with two different flush volumes is further characterized by variations which are possible for the smaller flush volume.

Figure 10:
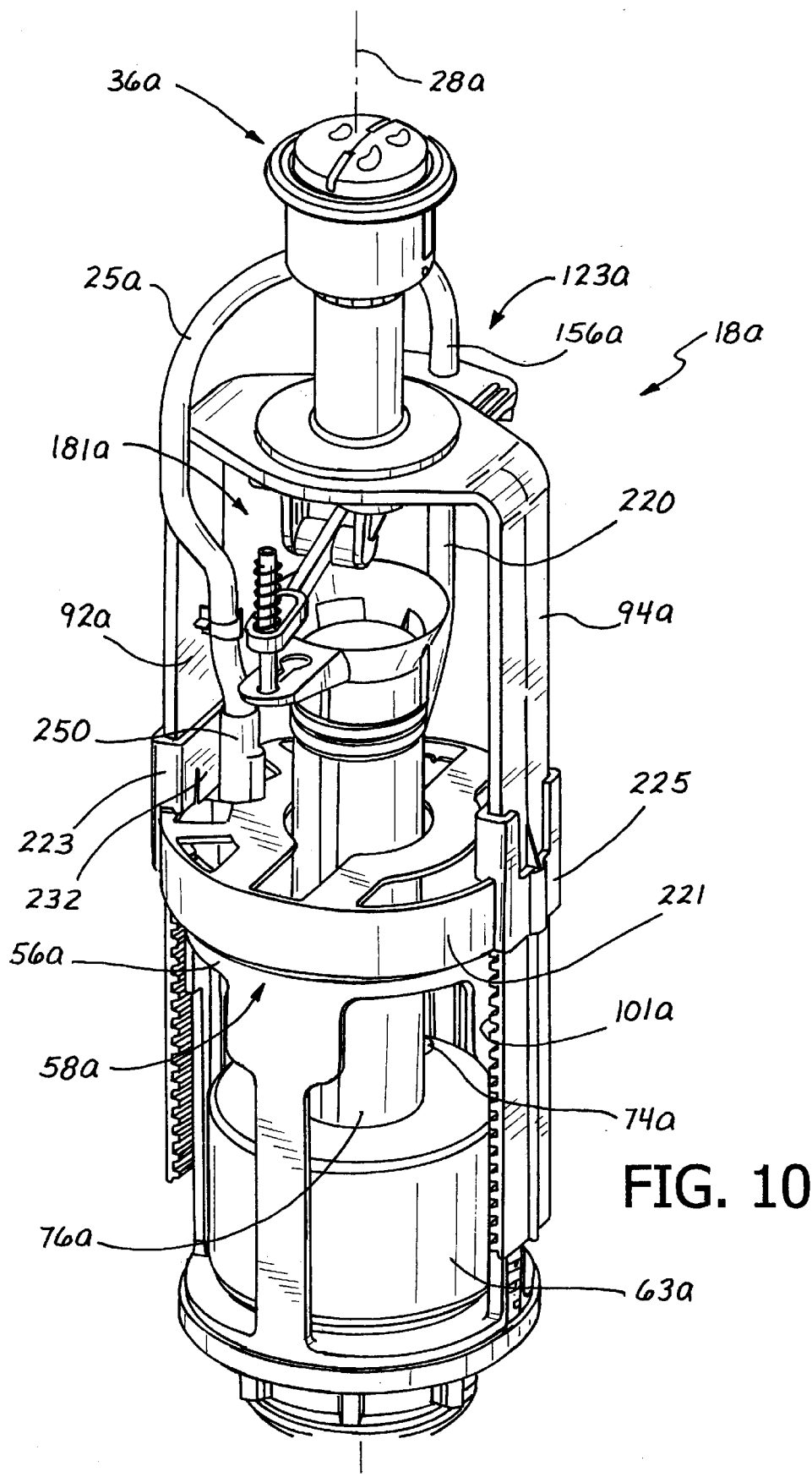
FIG. 10 is a perspective view of a further embodiment of the flush valve assembly of the present invention.

A further embodiment of the flush valve assembly associated with the present invention is illustrated in the perspective view of FIG. 10 where elements of structure similar to those previously discussed are designated with the same reference numeral followed with the lower case letter "a." For example, the flush valve assembly 18a has an axis 28a, and a supporting structure 91a including a top structure 281 and a bottom structure 283. A selection assembly 36a operates a lever 181a to lift the tube 76a and the float 63a and thereby initiate the toilet flush. A supporting structure includes the columns or supporting members 92a and 94a which are operatively positioned relative to a cylinder 56a having the annular ridges or flanges 58a. As in the embodiment of FIG. 2, a retention ring 221 holds the support members 92a, 94a in a fixed but variable position relative to the cylinder 56a thereby permitting adjustment of the height of the flush valve assembly 18a.

Figure 11:
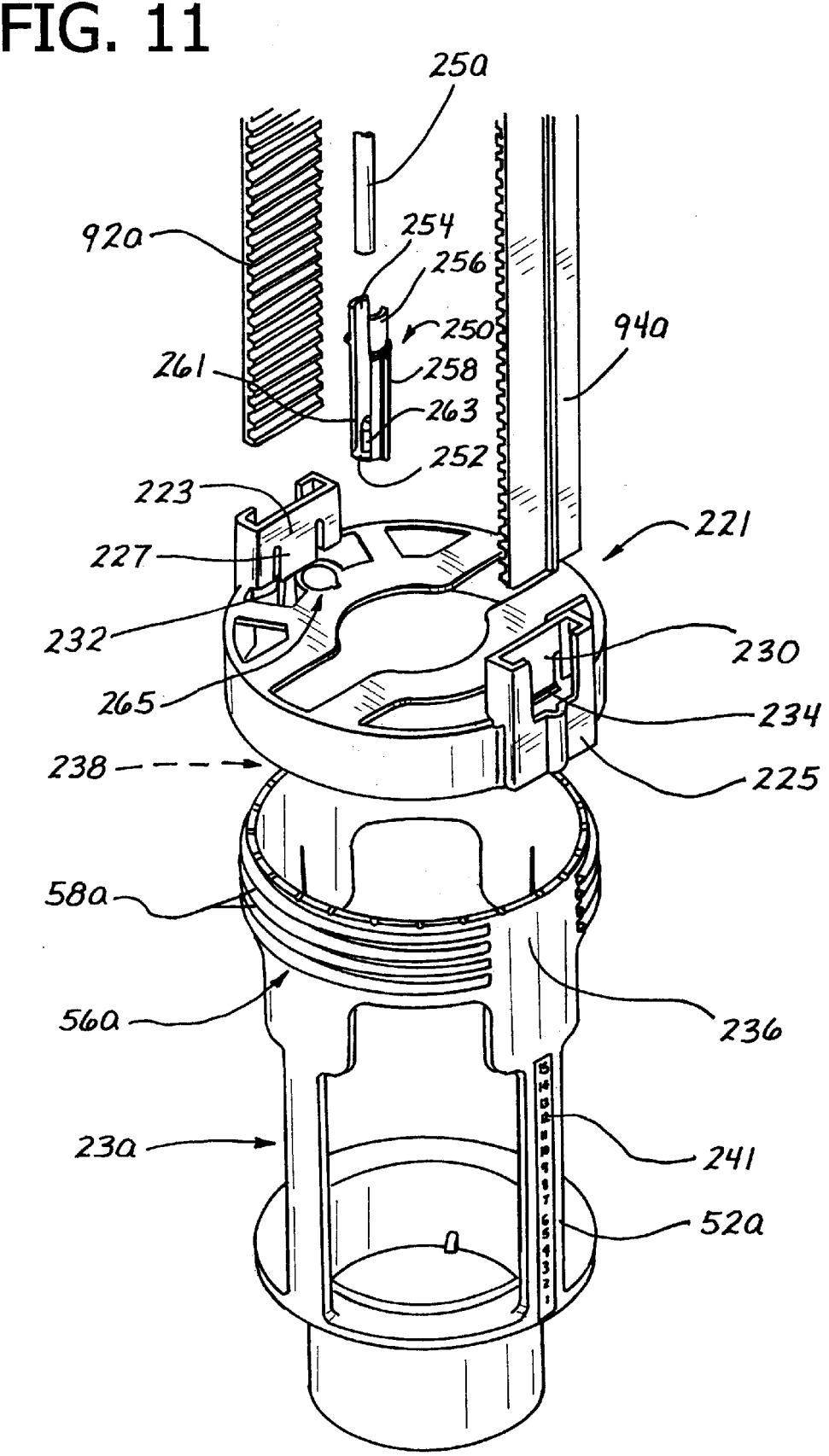
FIG. 11 is a partial exploded view of the FIG. 10 embodiment.

Of particular interest to this embodiment of the invention is the retention ring 221 which functions with the support members 92a, 94a of the top 221a, and the cylinder 56a of the bottom 23a. As opposed to the retention ring 112 of the FIG. 2 embodiment, this retention ring 221 includes a pair of sleeves 223 and 225 which are configured to receive the respective columns 92a and 94a. Each of these sleeves 223 and 225 includes an associated wing 227 and 230 which bendably supports tabs 232 and 234, respectively. These elements are best illustrated in the top plan view of FIG. 11. The tabs 232 and 234 extend radially outwardly to engage the projections 101a on the associated support members 92a and 94a. Importantly, this ensures that the retention ring 221 is maintained with the top 21a when it is separated from the bottom 23a. Thus the retention ring 221 need not become a free element of structure in the assembly process.

Notwithstanding this desired attached relationship between the retention member 221 and the support members 92a and 94a, their relative positions can be axially adjusted to provide the flush valve assembly 18a with a predetermined height. In order to accommodate this adjustment, the wings 227 and 230 can be bent radially inwardly to remove the tabs 232 and 234 from the associated projections 101a. This will permit the retention ring 221 to be moved axially along the support members 92a and 94a to a new position. At this desired location, the wings 227 and 230 can be released permitting the associated tabs 232 and 234 to re-engage the projections 101a. It is this position of the retention member 221 relative to the support members 92a and 94a which can be adjusted to dictate the height of the flush valve assembly 18a in the manner discussed below.

Figure 12:
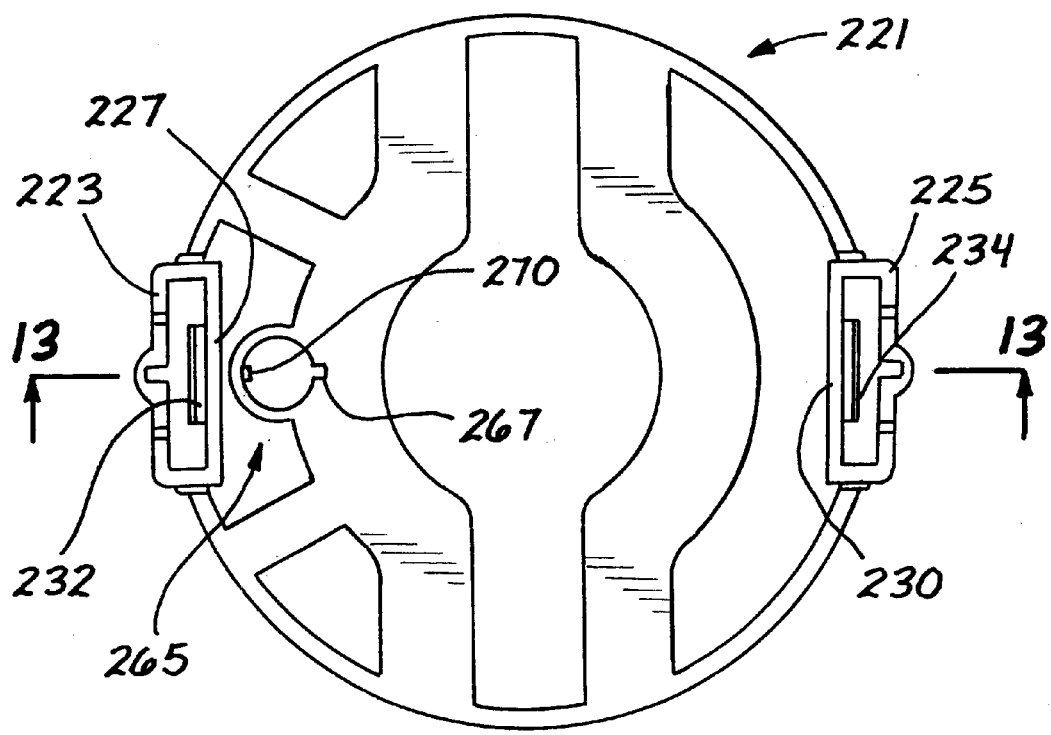
FIG. 12 is a top plan view of the retention ring associated with the FIG. 10 embodiment.
Figure 13:
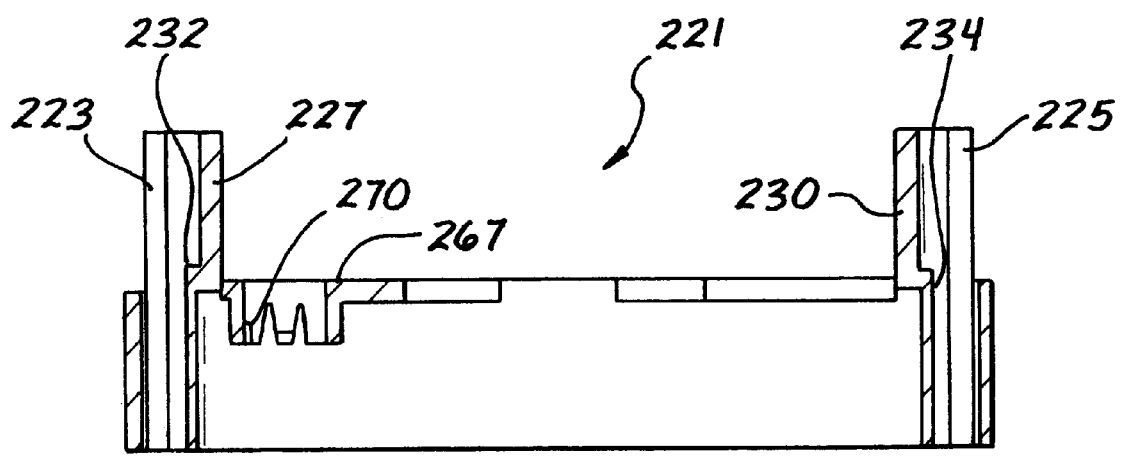
FIG. 13 is a radial cross-section view of the retention ring taken along lines 13—13 of FIG. 12.

With reference to the exploded view of FIG. 12, it can be seen that the bottom 23a of this embodiment includes the cylinder 56a and annular ridges or flanges 58a. However, in this embodiment, a geometric section 236 defined by both the cylinder 56a and the flanges 58a, is generally free of the flanges 58a. The geometric section 236 is associated with the sleeve 225 and the support member 94a. A similar geometric section 238 cannot be seen in FIG. 11 but is disposed 180 degrees around the cylinder 56a where it is associated with the sleeve 223 and the support member 92a.

In the process of constructing the flush valve assembly 19a, the retention ring 221 can be mounted on the associated support members 92a and 94a in the manner previously discussed. With the support members 92a, and 94a extending through the associated sleeves 223 and 225, as illustrated in FIG. 10, the top 21a and retention ring 221 can be moved axially relative to the bottom 23a. This movement is accomplished with the support members 92a and 94a moving along the respective geometric sections 238 and 236 where the projections 101a do not contact the flanges 58. This axial movement can be continued until the retention ring 221 seats over the cylinder 56a. At this point, with the support members 92a and 94a extending along the geometric sections 238 and 236, respectively. The top 21a can still be moved axially of the bottom 23a but only if the wings 227 and 230 are moved from the projections 101a in the manner previously discussed.

It can now be seen that a desired height for the flush valve assembly 18a can be achieved by initially locating the retention ring 221 at a predetermined position along the support members 92a and 94a, or alternatively, by adjusting the support ring 221 after it is operatively positioned over the flanges 58a by operation of the wings 227 and 230.

Once the desired height has been achieved, the entire top 21a and retention ring 221 can be angularly moved relative to the bottom 23a. With this angular movement, the projections 101a on the support members 92a and 94a will register with the flanges 58a between the geometric sections 236 and 238. This registration will fix the top 21a relative to the bottom 23a and thereby fix the height of the flush valve assembly 18a.

The height of the assembly 18a can be indicated by indicia 241 provided on one of the columns, such as the column of 52a associated with the bottom 23a. In this location, the indicia 241 marked by the associated support member, such as the member 94a. Alternatively, the indicia 241 can be disposed along one of the support members, such as the member 94a, where the associated sleeve 225 can provide the same indication as to height. With the indicia 241 in this location, the height indication would be provided on the subassembly of the top 21a and the retention ring 221, even prior to attachment of the subassembly to the bottom 23a.

Another feature of the FIG. 10 embodiment is associated with the pressure tube 25a which generally functions in the same manner as the tube 25 in the FIG. 2 embodiment. However, in this case, the distal end of the tube 25a is provided with a nozzle 250 best illustrated in FIG. 11. This nozzle 250 includes a bottom wall 252 and side walls 254 and 256 which extend upwardly from the bottom wall 254. An axial flange is disposed outwardly of the wall 256 while a plurality of ridges extend radially outwardly of the side wall 254. When fully assembled, the distal end of the tube 25a extends between the side walls 254 and 256 and over a nipple 263 which extends upwardly from the bottom wall 252. In a preferred embodiment, the nozzle 250 is formed of plastic and maintains a more defined orifice in the nipple 263.

Notwithstanding this advantage, the nozzle 250 provides additional features that are associated with its relationship to a holder 265 which can be formed as part of the retention ring 221. This holder 265, as best illustrated in FIG. 12, has the same radial cross-section shape as the nozzle 250 and includes an axial groove 267 and tab 270. With this configuration, the nozzle 250 can be mounted in the holder 265 with the axial flange 258 extending through the notch 267. This maintains the nozzle 250 in a preferred angular position so that the ridges 261 form a detent mechanism with the tab 270. This enables the nozzle 250, and hence the end of the tube 25a to be held at different levels relative to the water 18 in the tank 14 (FIG. 1). In the manner previously discussed, the particular level desired for the end of the tube 25a will ultimately dictate the flush water volume associated with the assembly 18a.

Of course it will be appreciated that there are many variations on the structure of these preferred embodiments which will now be apparent. Clearly the push buttons 198 and 201 can be replaced with other actuation mechanisms to achieve the dual-flush capability. Structures other than the slide assembly 123 can also be used to facilitate or inhibit fluid communication between the tubes 220 and 25.

Another modification might include the addition of a second pressure tube, such as the pressure tube 25. This second pressure tube could be disposed in fluid communication with the tube 220 when the slide subassembly 123 is in the position associated with the larger flush volume. In such an embodiment, the end of the second pressure tube would extend more deeply into the water in the tank than the end of the pressure tube 25 associated with the smaller flush volume. This modification would result in an embodiment wherein both the larger flush volume and the smaller flush volume are adjustable in the manner disclosed.

Many modifications will also be possible with respect to the axial adjustment structure 32. A structure which facilitates not only axial adjustment but also rotation about the axis 28 is of course preferred.

A further embodiment of the invention is illustrated in FIGS. 14–25 where elements of structure similar to those previously discussed are designated with the same reference numeral followed by the lower case letter "b." For example, it will be noted that this embodiment of the flush valve assembly 18b includes the support structure 91b with a top structure 281 and a bottom structure 283. As in the previous embodiment, the top structure generally carries the selector or button assembly 36b and is adapted for disposition in a fixed relationship with the top of the tank 14 (FIG. 1). The bottom structure 283 generally carries a float assembly 285 and is adapted to be fixed to the bottom of the tank 14 (FIG. 1). Float assembly 285 in this case includes the float 63b and the overflow tube 76b.

The bottom structure 283 includes the upwardly extending columns 47b and 52b which mate respectively with downwardly extending columns or support members 92b and 94b. The support members 47b and 92b, as well as the support members 52b and 94b have a telescoping relationship which permits the height of the flush valve assembly 18b to be adjusted. This adjustment permits the valve to be adapted for use generally in any tank 14 (FIG. 1) regardless of the particular height separating the top of the tank 14 from the bottom of the tank 14. Thus, the associated pairs of columns 47b and 92b, and 52b and 94b, can be adjusted in length and then fixed at a desired height for the valve assembly 18b.

This height adjustment is facilitated by a tab 287 and sleeve 290, associated with the columns 47b and 92b, and a tab 292 and sleeve 294 associated with the columns 94b and 52b. The tab 292 and sleeve 294 are best illustrated in the enlarged view of FIG. 16. This view also illustrates that the downwardly extending column 94b can be provided with the plurality of equally spaced and inwardly extending flanges or ridges 101b. The tab 292 carried by the upwardly extending column 52b can be provided with at least one tooth 296 which is adapted to engage a particular one of the ridges 101b at a preferred height for the valve assembly 18b. The tooth 296 can be formed integral with the tab 292 and disposed to face outwardly in an engaging relationship with the ridges 101b.

Figure 16:
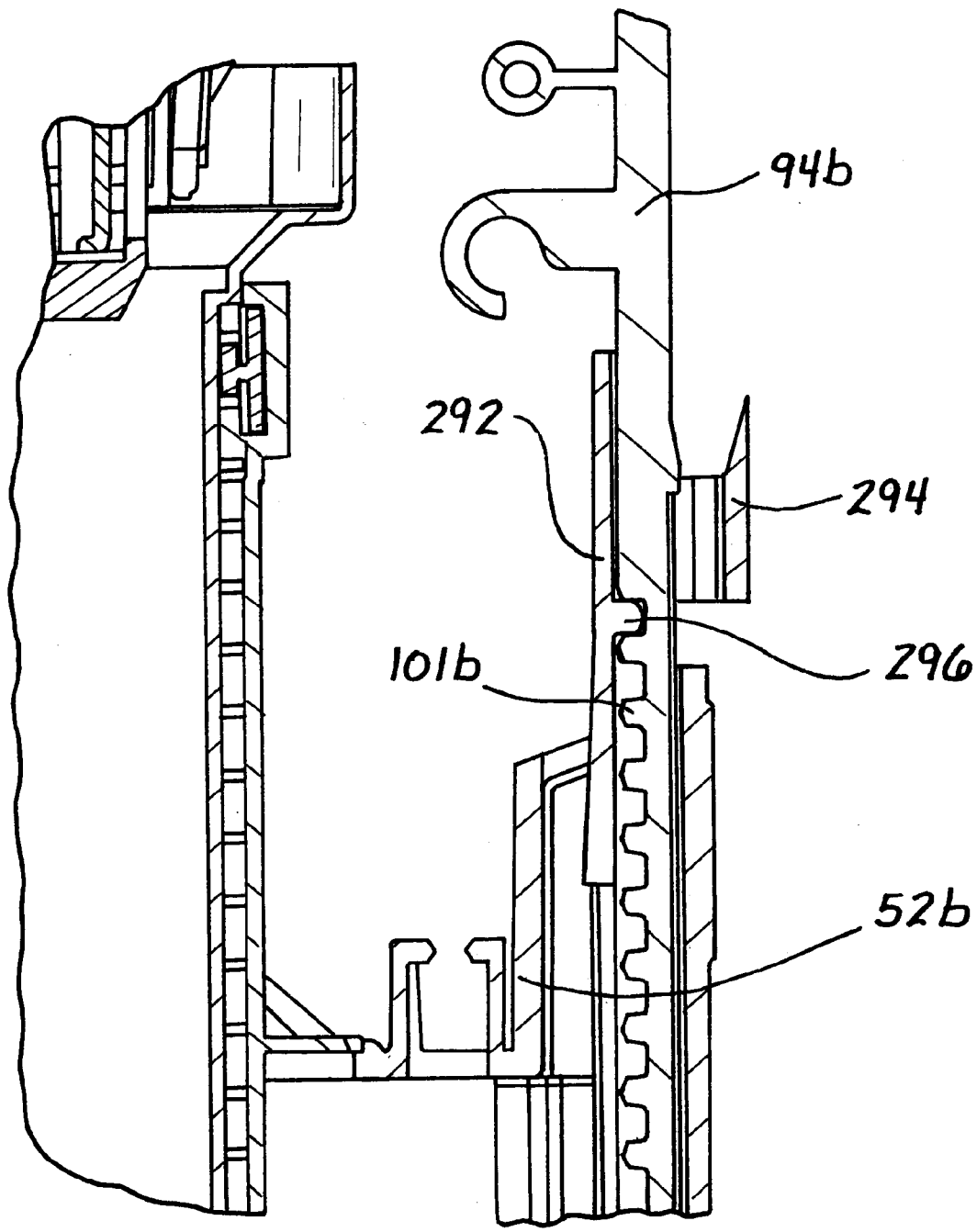
FIG. 16 is an enlarged cross-section view of a column, tab, sleeve and sleeve assembly of the FIG. 15 embodiment.

The tab 292 is between a first position illustrated in FIG. 16 wherein the tooth 296 engages the ridges 101b, and a second position wherein the tab is moved radially inwardly, to the left in FIG. 16, to disengage the tooth 296 from the ridges 101b. In the first position, the tab 292 holds the associated columns 94b and 52b in a fixed relationship. In the second position, the tab 292 disengages the column 52b thereby permitting the columns 52b and 94b to be moved in a telescoping relationship to vary the height of the flush valve assembly 18b.

It will be noted that the tab 287 and associated sleeve 290, on the opposite side of the valve assembly 18b, will appear as a mirror image of FIG. 16. The tab 287 on that side of the assembly 18b would engage ridges on the column 92b in a first position and disengage those ridges when moved radially inwardly, to the right in FIG. 15.

Thus, in order to facilitate a height adjustment, both of the tabs 287 and 292 would be moved radially inwardly. When the desired height was achieved, the tabs 287 and 292 could be moved radially outwardly to fix the height of the columns 92b and 94b relative to the associated columns 47b and 52b, respectively.

Figure 15:
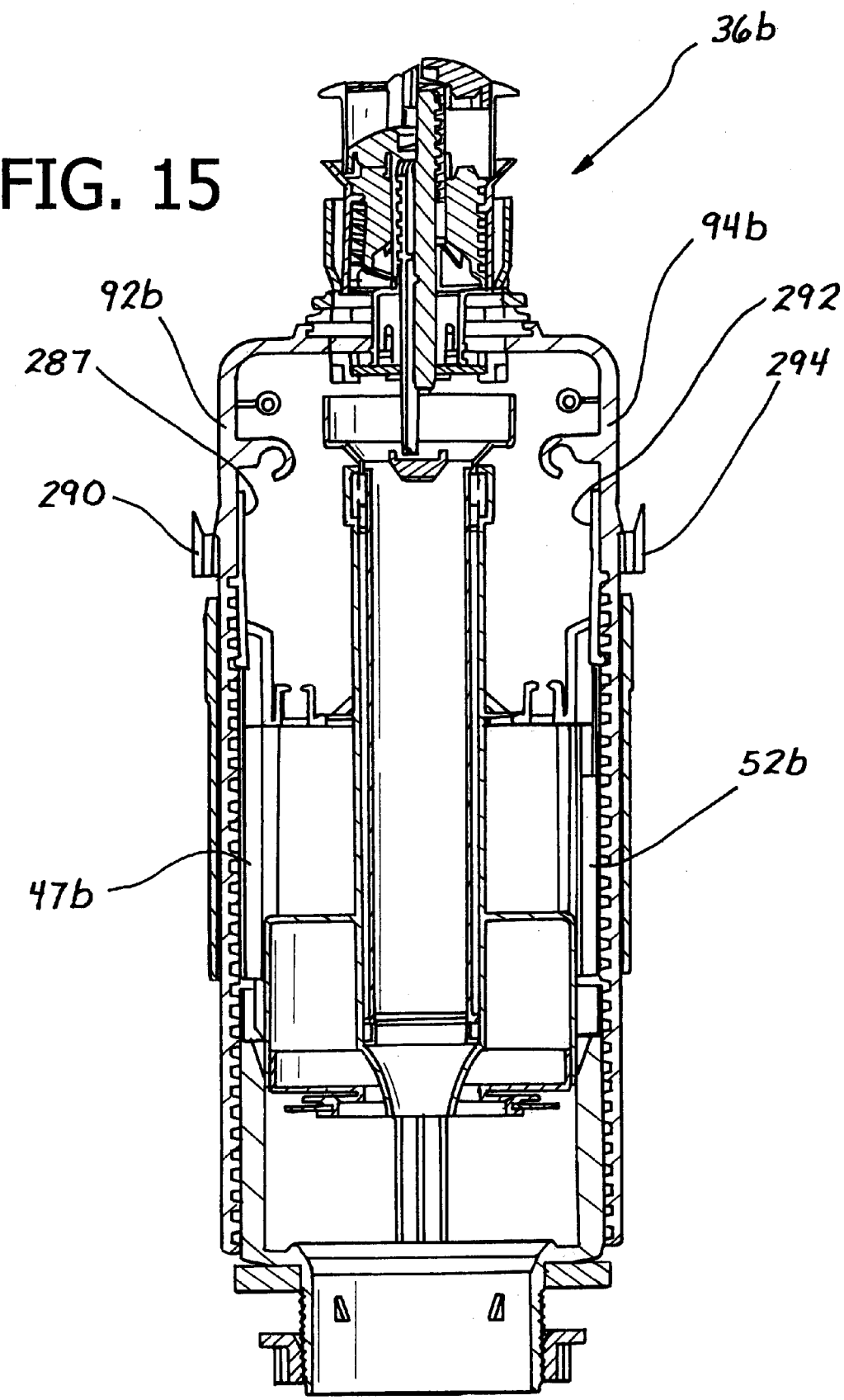
FIG. 15 is an axially cross-section view taken along lines 15—15 of FIG. 14.

In the embodiment of FIG. 15, the tabs 287 and 292 are formed integral with the sleeves 290 and 294 which surround the columns 92b and 94b, respectively. With this construction, the sleeves 290 and 294 on the outside of the valve assembly 18b can be pushed radially inwardly to move the tabs 287 and 292, respectively, closer together. This will disengage the tooth 296 from the associated ridges 101b and permit adjustment of the valve assembly 18b.

In this embodiment, the tabs 287 and 292 together with their associated sleeves 290 and 294, are biased to the first engaging positions so that the sleeves 290 and 294 can be released to maintain the columns 92b and 47b, and the columns 94b and 52b, in their fixed relationships. The resulting change in the height of the valve assembly 18b can be seen in a comparison of FIG. 15, which shows an assembly of reduced height, and FIG. 17, which shows an assembly of increased height.

Figure 17:
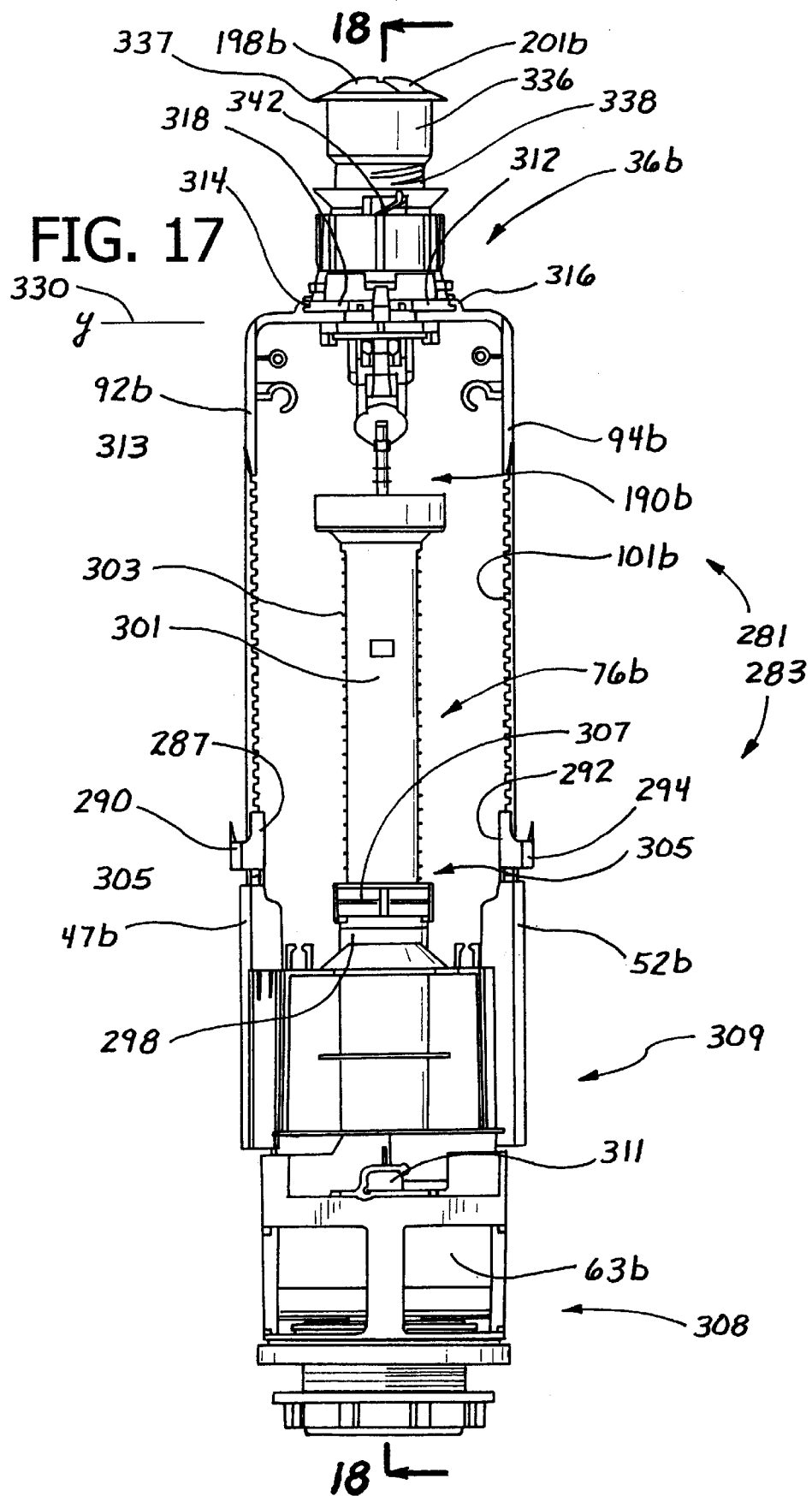
FIG. 17 is a side elevation view of the FIG. 14 embodiment but turned 90° to show the valve structure in a heightened state.

With further reference to FIG. 17, it can be appreciated that an adjustment in the height of the support structure 91b can be complemented with an overflow tube 76b which is also adjustable in height. In this embodiment, the overflow tube 76b includes a larger bottom tube 298 which has a telescoping relationship with a smaller top tube 301. In this case, the top tube 301 can be provided with exterior ridges or flanges 303 which are accessible through a window 305 in the bottom tube 298.

A clip 307 is disposed outwardly of the bottom tube 298 but includes at least one tooth which extends through the window 305 to engage the ridges 303. The clip 307 can be completely removed to disengage the ridges 303 and accommodate the desired height adjustment. The clip can then be replaced to maintain a fixed relationship between the bottom tube 298 and top tube 301. Alternatively, the clip 305 can be adapted to be carried by the lower tube 298, but provided with properties for adjustment relative to the window 305 between a first position and a second position. In the first position of the clip 307, the tooth 310 engages the ridges 303 to hold the bottom tube 298 and the top tube 301 in a fixed relationship. In the second position of the clip 305, the tooth 310 has a spaced relationship with the ridges 303 thereby facilitating the telescoping relationship between the tube 298 and the tube 301. Thus, with the clip 307 in the second position the height of the overflow tube 76b is adjustable; with the clip 307 in the first position, the overflow tube 76b is fixed at the desired height.

The embodiment of FIG. 17 is configured with a bottom structure 283 which includes a bottom housing 308, which is adapted for connection to the bottom 23 of the tank 14 (FIG. 1), and an intermediate housing 309, which is coupled to the top structure 281 by the tabs 287 and 292. With this construction, a bayonet connection 311 can be used to removably couple the intermediate housing 309 to the bottom housing 308. This greatly facilitates access to the float 63b and permits adjustment or repair of the gasket 61b on the bottom of the float 63b. With a simple twisting movement applied to the top structure 281, the bayonet coupling 311 will permit removal of the top structure 281 and the intermediate housing 309 without requiring detachment of the bottom housing 308 from the tank 14 (FIG. 1). The intermediate housing 309 canthen be inverted to gain easy access to the float 63b. Following the float repair, the bayonet structure 311 can be recoupled to connect the intermediate housing 309 and top structure 281 to the bottom housing 308.

With the adjustment in the height of the support structure 91b and/or the overflow tube 76b, it may be necessary to also adjust the link pin 190b which connects the two. This adjustment of the link pin 190b is facilitated by providing the pin 190b with a plurality of equally spaced, outwardly extending fins 313. These fins 313 are preferably formed with the same separation or pitch as the ridges 101b on the columns 92b and 94b, and the ridges 303 on the overflow tube 76b. With this relationship, the link pin 190b can be rotated to disengage the fins 313 and accommodate changes in the height of either or both the supporting structure 91b and the overflow tube 76b.

Figure 18:
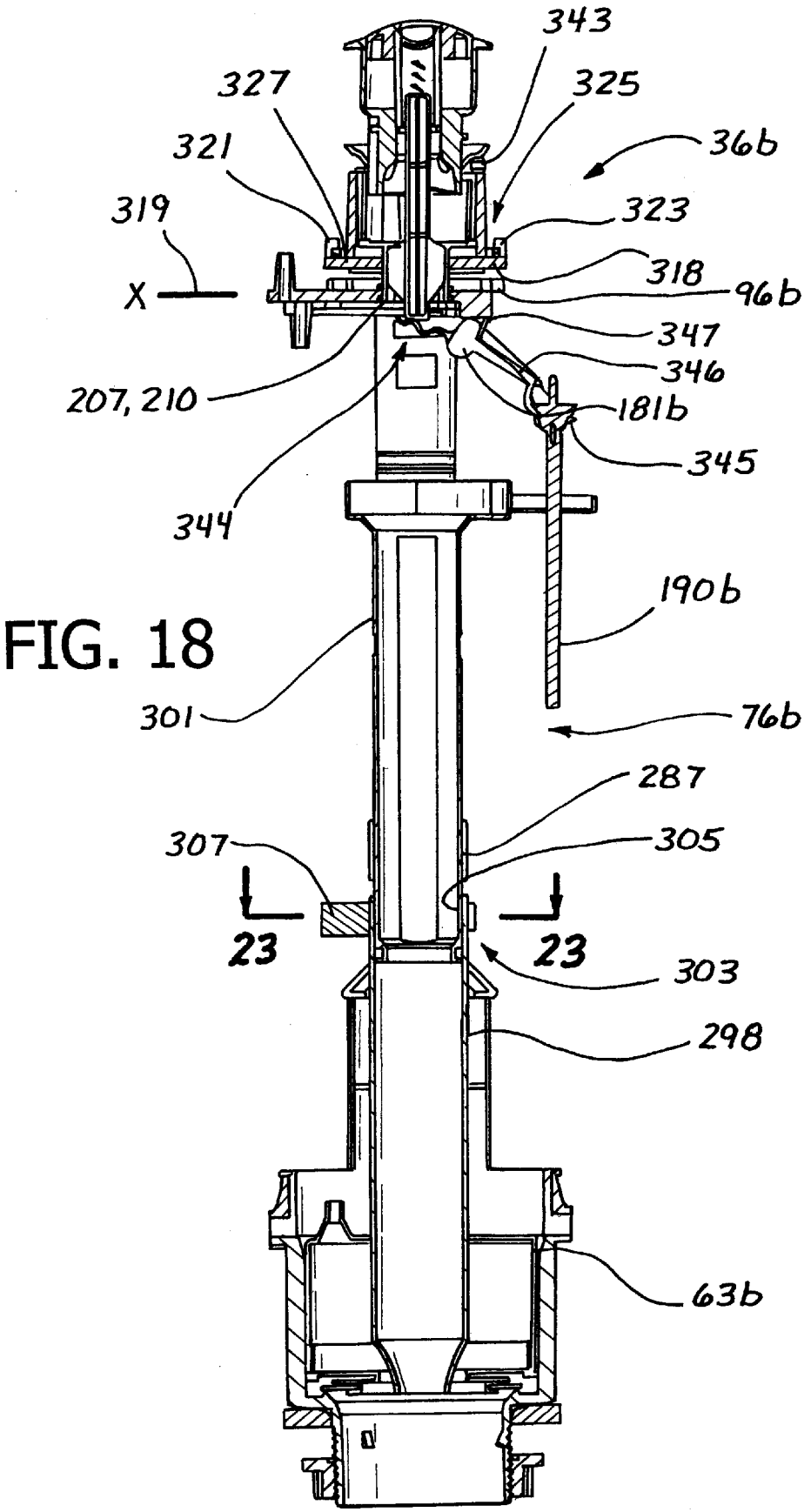
FIG. 18 is an axial cross-section view taken along lines 18—18 of FIG. 17.
Figure 19A:
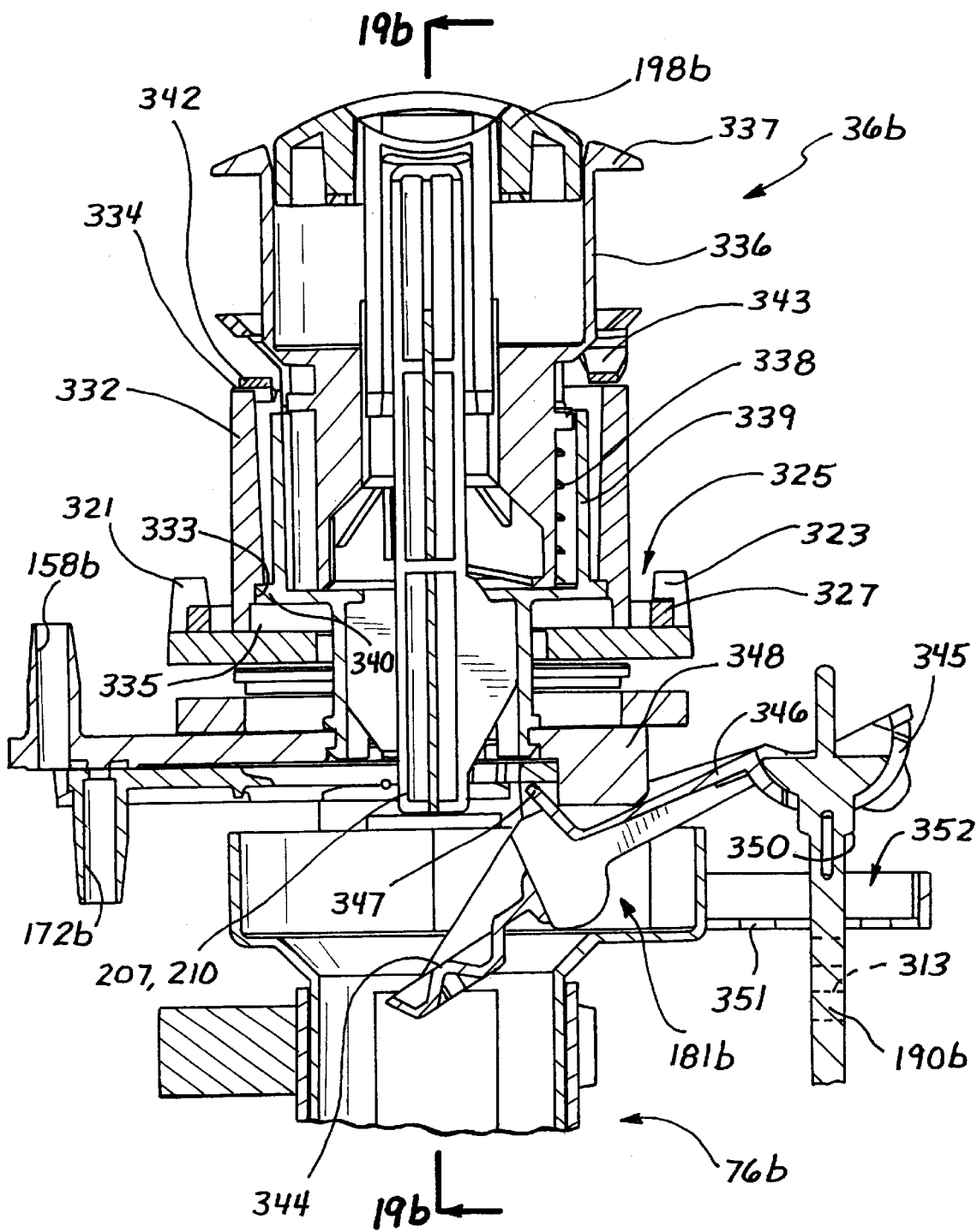
FIG. 19a is an enlarged axial cross-section view of the button assembly also illustrated in FIG. 17.

A further aspect of the present invention relates to the selector or button assembly 36b best illustrated in the detailed view of FIG. 19a. As is the case with the view of FIG. 18, the view of FIG. 19a is turned ninety degrees from the orientation of the button assembly 36b in FIG. 17.

Figure 14:
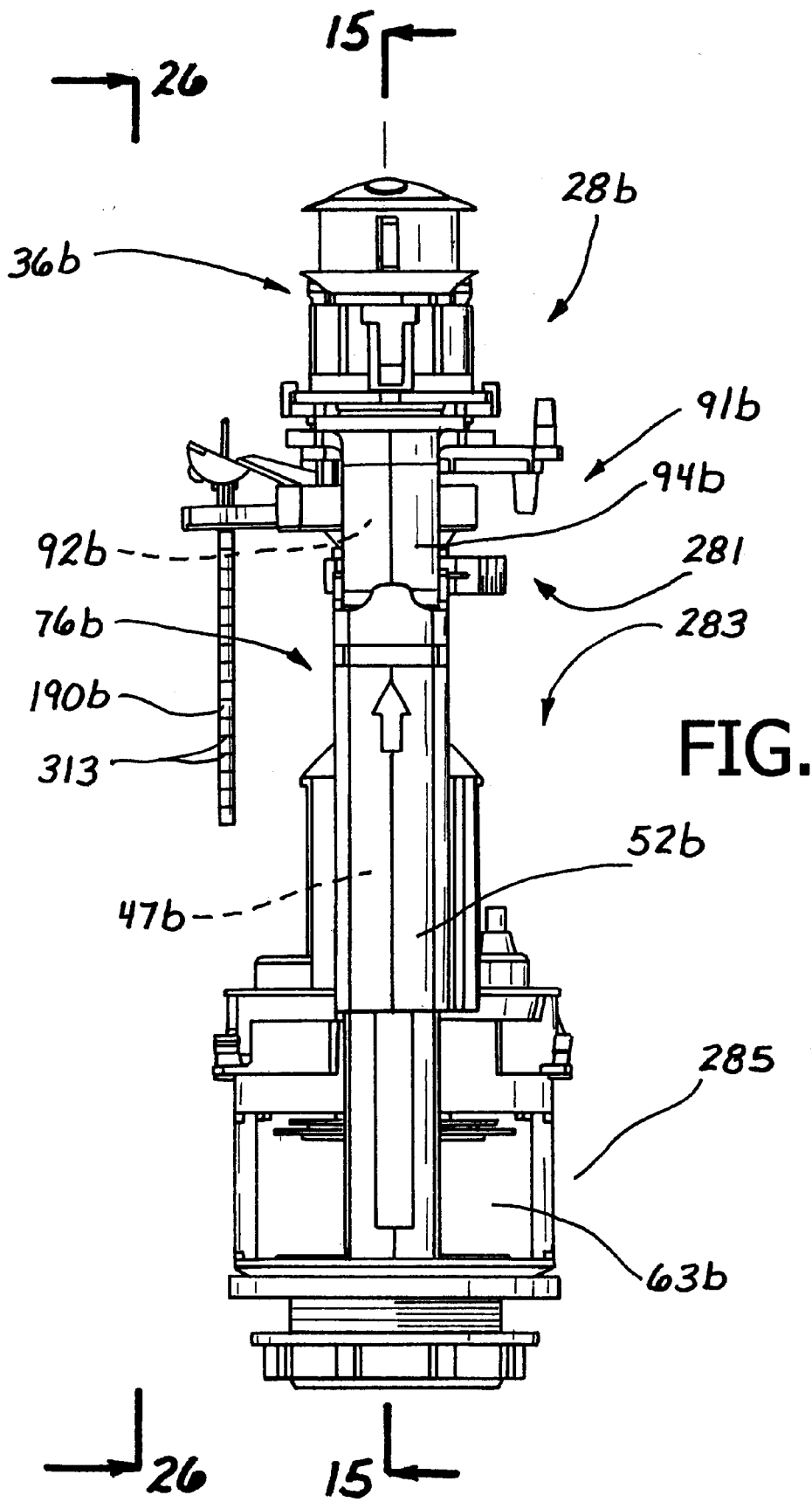
FIG. 14 is a side elevation view of a further embodiment of the flush valve assembly of the present invention.

It is of particular advantage that this button assembly 36b is free to move in both an x plane and a y plane perpendicular to the axis 28b (FIG. 14). This enables the button assembly 36b to accommodate small variations in the coaxial alignment of the button hole in the top 21 of the tank 14, and the flush hole in the bottom 23 of the tank 14 (FIG. 1). With reference to FIG. 17, it can be seen that the button assembly 36b is free to move out of the plane of the page due to a slide channel 312 which is formed between flanges 314 and 316. The button assembly 36b can be mounted on a slide 318 which is disposed in this slide channel 312. The slide 318 is movable between the flanges 314 and 316 and carries the remainder of the button assembly 36b along an x axis which is shown in FIG. 18 and extends perpendicular to the page in FIG. 17.

With reference to FIG. 18 and the enlarged view of FIG. 19a, it can be seen that the slide 318 is also formed with a pair of opposing flanges 321 and 323 which define a slide channel 325. A slide 327 is within this channel 325 out of the plane of the page in FIG. 18. This movement of the slide 327 carries the remainder of the button assembly 36b along a y axis 330 which is shown in FIG. 17 and extends perpendicular to the page in FIG. 18. A cylinder 332 having a lip 334 is carried by the slide 327 and accordingly is movable along both the x axis 319 and the y axis 330 to facilitate orientation of the button assembly 36b.

At the end of the cylinder 332 opposite the lip 334, an array of teeth 333 are axially aligned and circumferentially disposed around the cylinder 332. An annular space 335 is provided beneath these teeth 333. A receiver 339 includes a pair of flanges 340 which extend outwardly to teeth which register with the circumferential teeth 333 of the cylinder 332. With this construction, orientation of the buttons 198b and 201b relative to the front edge of the tank 14, can be accomplished by depressing the button housing 336 and thereby forcing the receiver 339 downwardly within the cylinder 332. This causes the bottom of the receiver 339 and the flanges 340 to move into the annular space 335 where the teeth on the flange 340 disengage the circumferential teeth on the cylinder 332. This enables the receiver 339 and button housing 336 to be rotated into alignment with the tank 14. Once this alignment is achieved, the button housing 336 can be released to move upwardly under the bias of a pair of living hinges 342 and 343, until the teeth on the flange 340 engage new teeth 333 on the circumference of the cylinder 332. This again fixes the angular relationship of the cylinder 332, the receiver 339 and button housing 336 at the properly aligned position.

With further reference to FIG. 19a, it can be seen that the buttons 198b and 201b are carried in a housing 336 which is provided with an annular flange 337 and partial exterior threads 338. The housing 336 is sized to fit within the receiver 332 as best illustrated in FIG. 19a. With this relationship, the partial threads 338 form a bayonet fitting with inwardly extending flanges on the receiver 339.

Figure 19B:
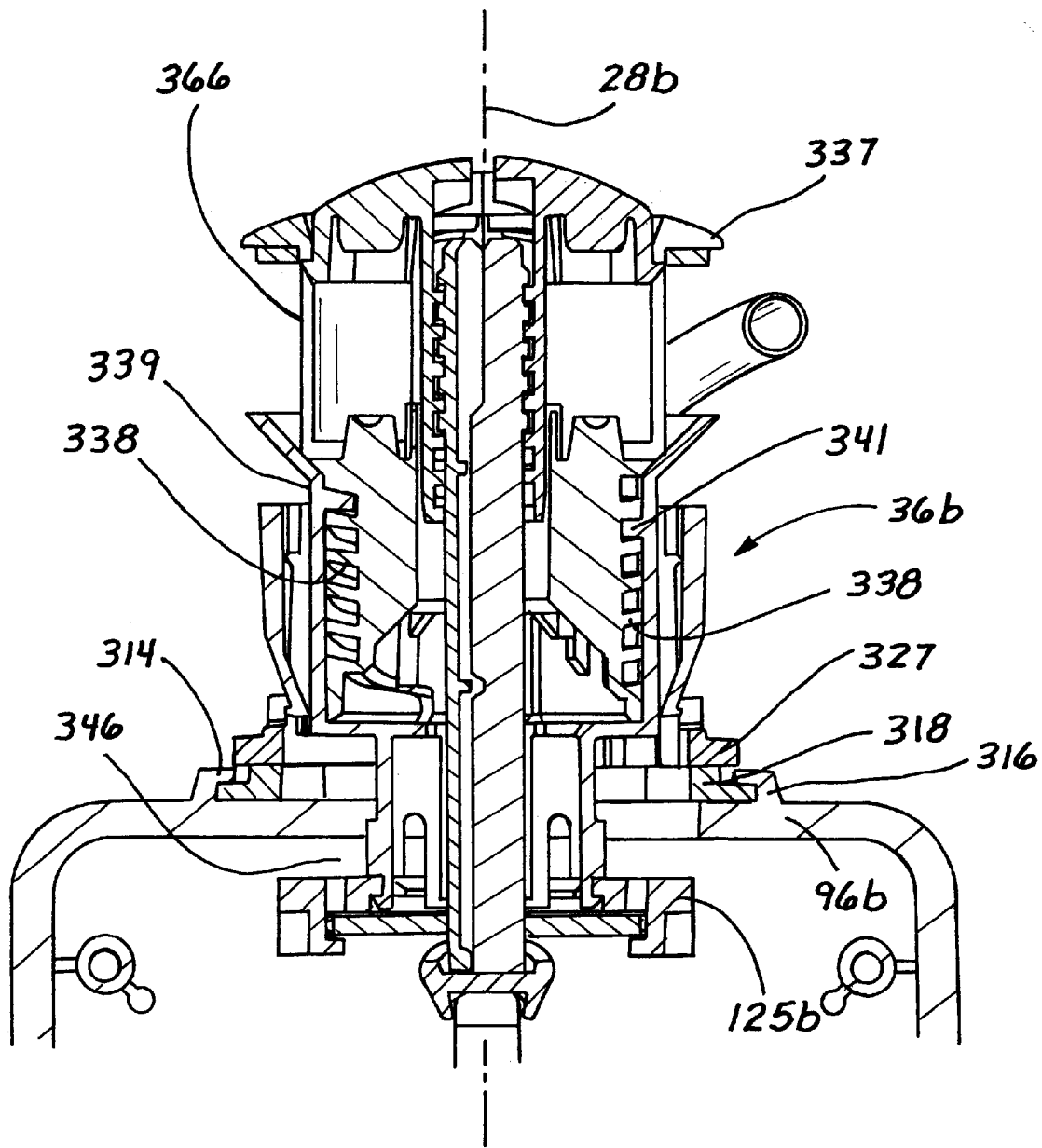

As best illustrated in FIG. 19b, there is a spring gap 145 between the base 125b and the flange 96b to allow axial movement of the button assembly 36b to accommodate height variations in the tank top. This height adjustment occurs by the flexure of the slide 318 between the flanges 314 and 316, and the pulling of flanges 321 and 323 (FIG. 19a) by the slide 327. The slide 318 is biased to provide maximum spring gap when no axial force is being applied to the annular flange 337.

A flange 341 can be provided to extend outwardly from the receiver 339, preferably on a side opposite to that of the threads 338. This flange 341 is sized to ride in a vertical slot in the housing 336. The flange 341 aligns with this slot at a single radial position of the housing 336 which insures that the buttons 198b and 202b are appropriately aligned with their respective half-shafts 207 and 210. When the flange 341 is aligned with its slot in the housing 336, the housing 336 and threads 338 drop into the receiver 339. At this point the annual flange 337 associated with the housing 336 can be rotated to provide for a bayonet engagement between the treads 338 and the receiver 339.

Since the threads 338 are helical, this rotation will tend to draw the flange 337 closer to the receiver 339. If the flange 337 is already abutting the top of the tank 14, this rotation of the threads will cause the receiver 339 to rise within the tank 14 (FIG. 1). The amount of this rise is dependent on the pitch of the threads 338 which in a preferred embodiment are separated by a distance of 0.145 inches.

Raising the level of the receiver 332 within the tank 14 also tends to raise the lever 181*b*, the link pin 190*b*, the overflow tube 76*b*, and the float 63*b*. Under these circumstances, the mere rotation of the button housing 336 could tend to raise the float 63*b* off of the flush valve and produce a leakage of water from the tank. In order to inhibit this leakage, the link pin 190*b* in a preferred embodiment is provided with an offset shoulder 350 best illustrated in the detail of FIG. 19*a*. When the flush valve assembly 18 is initially installed in the toilet 10 (FIG. 1) the link pin 190*b* can be raised and rotated within the cup 345 so that it is elevated from the cup 345 by an offset distance associated with the length of the shoulder 350. If the pin 190*b* is then rotated, its fins 313 will engage bendable projections 351 in the bottom of a pan 352 carried by the overflow tube 76*b*. These projections 351 will maintain the pin 190*b* in an offset position spaced from the bottom of the cup 345. Then when the button housing 336 is dropped into the receiver 339 and turned, any rise in the receiver 339 will merely elevate the cup 345 of the lever 181*b* without elevating the float 63*b*.

Another feature of the present invention is illustrated in FIGS. 18 and 19. This feature is associated with the half-shafts 207 and 210 of the button assembly 36*b*, which contact a ridge 344 at one end of the lever 181*b*. At the opposite end of the lever 181*b*, a cup 345 is formed to receive the link pin 190*b*. Referring to FIG. 18, it will be noted that when a button and associated shaft 207 or 210 are depressed, they force the ridge 344 downwardly. This raises the link pin 190*b* which carries with it the overflow tube 76*b* and the float 63*b*. Thus, depression of one of the buttons 207, 210 results in lifting the float 63*b* to initiate the flushing of the toilet 10 (FIG. 1).

In the interest of using all of the water in the tank 14 for a full flush, it is desirable that the float 63*b* may be maintained off of the valve seat until the water in the tank 14 is fully exhausted. If one relies solely on the flotation of the float 63*b*, the weight of the structure associated with the overflow tube 76*b* and float 63*b* will tend to close the flush valve before the tank is fully vacated.

In accordance with the present invention, this weight is offset so that the float 63*b* rides higher on the surface of the water 16 inhibiting closure of the valve 30 until the flush water is vacated from the tank 14. This offset of the structural weight is facilitated in the illustrated embodiment with a cantilevered beam 346 which is carried by the lever 181*b* and has an end 347. The beam 346 serves two functions in the present embodiment both involving a block 348 of the button assembly 36*b*.

When the link pin 190*b* and associated float 63*b* are in the uppermost flushing position, the beam 346 is disposed relative to the block 348 in a normally biased state as illustrated in FIG. 19. In order for the pin 190*b* to drop, the beam 346 must be bent from this normally biased state in order the clear the block 348. This resistance to bending of the beam 346 tends to maintain the pin 190*b* and float 363*b* in the uppermost position thereby offsetting the weight of the associated structure. As the float 63*b* drops with the surface of the water 16, the end 347 of the beam 346 clears the block 348 enabling the flush valve 30 to close as illustrated in FIG. 18. Note that the end 347 of the beam 346 rides along the block 348 as it tends to go over center back to its normally biased position. Thus the beam 346 and block 348 function as a means for offsetting the weight of the float structure so that the flush valve will close only when the water in the tank is substantially exhausted.

Once the flush valve is in the closed state as illustrated in FIG. 18, the beam 346 performs another function. As the lever 181*b* functions to move over center, due to the bias of the beam 346, it tends to stay in either the open state illustrated in FIG. 19 or the closed state illustrated in FIG. 18. With a bias to the closed state, the half-shafts 207, 210 are biased to the upward state to facilitate alignment of the button assembly 36*b*. Jamming is even further inhibited by providing the half-shafts 207 and 210 with bottom surfaces which are generally flat and horizontal. These bottom surfaces provide a substantially line contact with the ridge 344 associated with the lever 181*b*. As a result, pivoting of the lever 181*b* does not apply any radial forces to the half-shafts 207 and 210 which might otherwise cause the button assembly 36*b* to jam.

Figure 20:
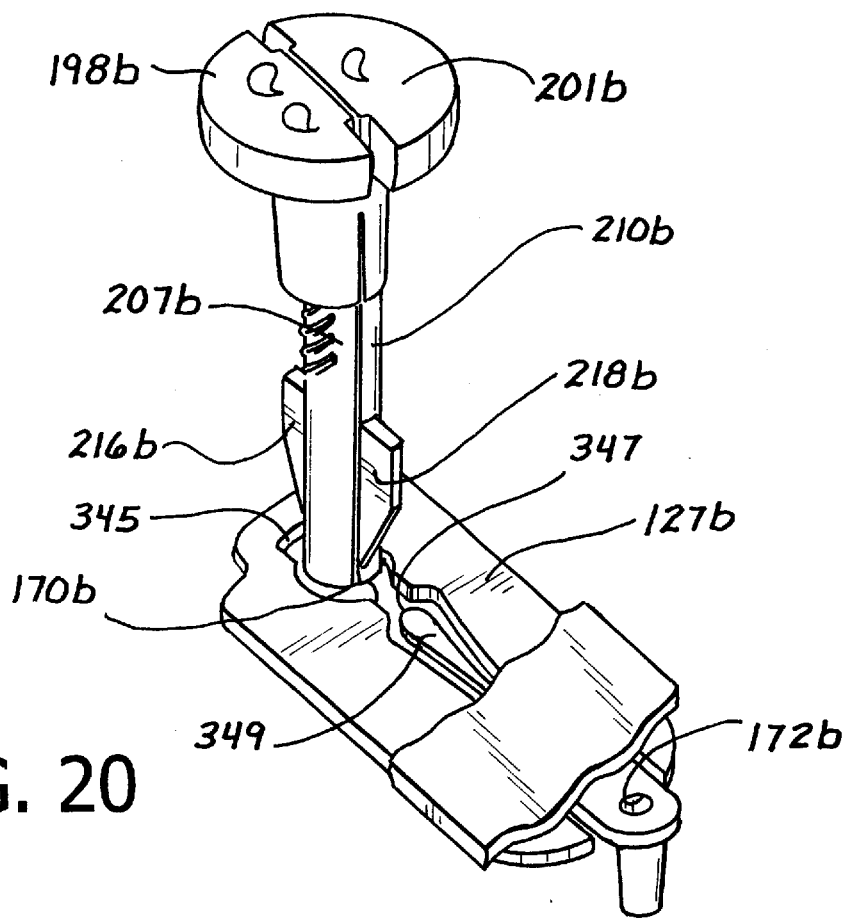
FIG. 20 is a perspective view of portions of the button assembly including a shuttle with a cantilever beam.

The perspective view of FIG. 20 illustrates a further aspect of this embodiment. In this view, the buttons 198*b* and 201*b* are shown with their respective shafts 207*b* and 210*b* and their respective cams 216*b* and 218*b*. As in the previous embodiment, the buttons 198*b* and 201*b* can be depressed to move their respective cams 216*b* and 218*b* into the slot 170*b* in the slide 127*b*. As opposed to the embodiment illustrated in FIG. 2, however, it can be seen that the slide 127*b* is provided with a slot 170*b* which is longitudinally asymmetrical and is defined at one end by a surface 345 and at the other end by a surface 347 on a cantilever beam 349. When the button 198*b* is depressed along with its shaft 207*b*, it forces the cam 216*b* into the slot 170*b* where it contacts the surface 345 pushing the slide or shuttle 127*b* to the left in FIG. 20. This causes the hole 172*b* to misalign with the hole 158*b*, as illustrated in FIG. 19, and prevents air from venting from the float 63*b* (FIG. 18) to ensure a full flush.

In contradistinction, depression of the button 201*b* and associated shaft 210*b* carries the cam 218*b* into the slot 170*b* where it contacts the surface 347 of the deflection member or beam 349. This causes the shuttle or slide 127*b* to move to the right in FIG. 20 carrying the hole 172*b* into alignment with the hole 158*b*. As previously discussed, alignment of these holes facilitates the venting of air from the float 63*b* and results in a shorter flush.

Figure 21:
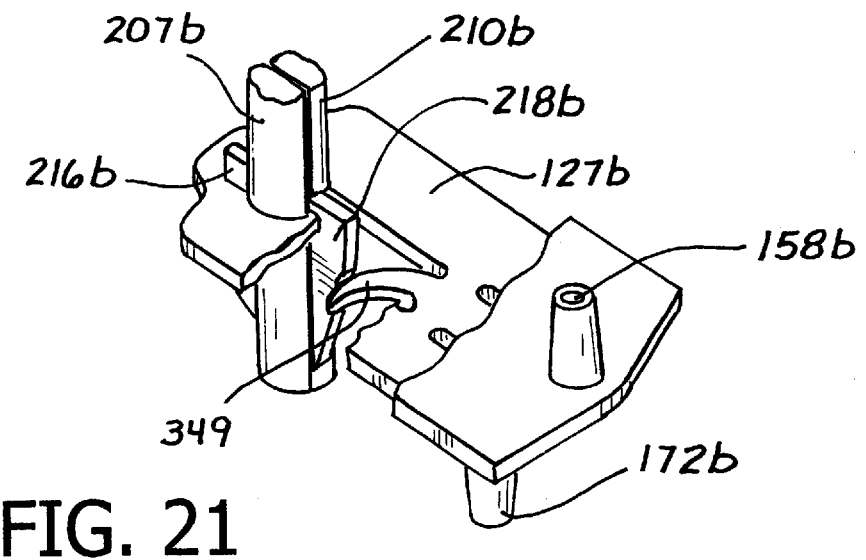
FIG. 21 is a perspective view of the shuttle showing the cantilevered beam depressed when both buttons are activated simultaneously.

The function of the deflection member or cantilever beam 349 can be better understood with reference to FIG. 21 which illustrates operation of the slide 127*b* when the buttons 198*b* and 201*b* are accidentally depressed simultaneously. Under these circumstances, both of the cams 216*b* and 218*b* enter the slot 170*b* at the same time. The cam 216*b* pushes against the surface 345 and the cam 218*b* pushes against the surface 347. Without sufficient length to accommodate both of the cams 216*b* and 218*b*, the cantilever beam 349 deflects as illustrated in FIG. 21. As a result, the accidental depression of both buttons 198*b* and 201*b* simultaneously does not result in jamming the slide 127*b*, but rather accommodates a full flush without any damage to the button assembly 36*b*. When the buttons are released, the cams 216*b* and 218*b* withdraw from the slot 170*b* and the cantilever beam 349 returns to the general plane of the slide 127*b*.

Figure 22:
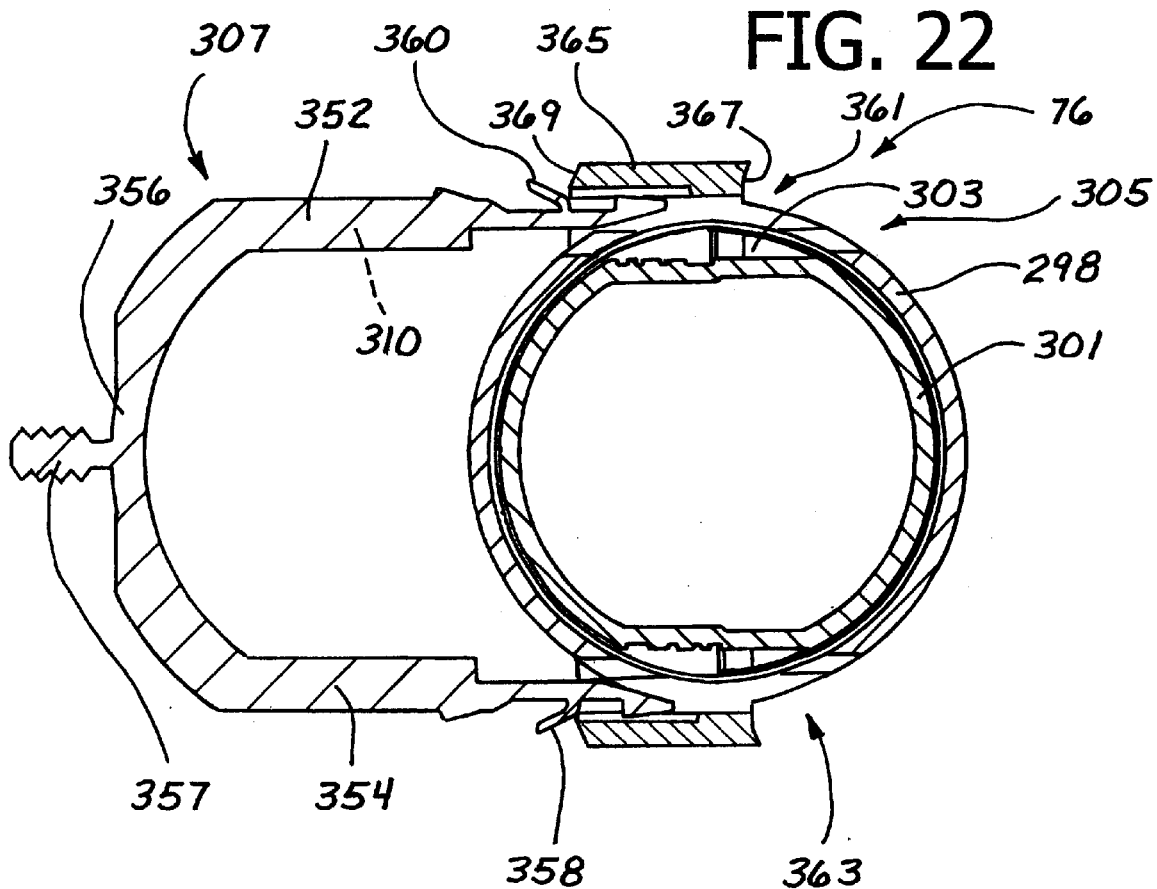
FIG. 22 is a radial cross-section, expanded view of a clip adapted for use in adjusting the height of a telescoping overflow tube.
Figure 23:
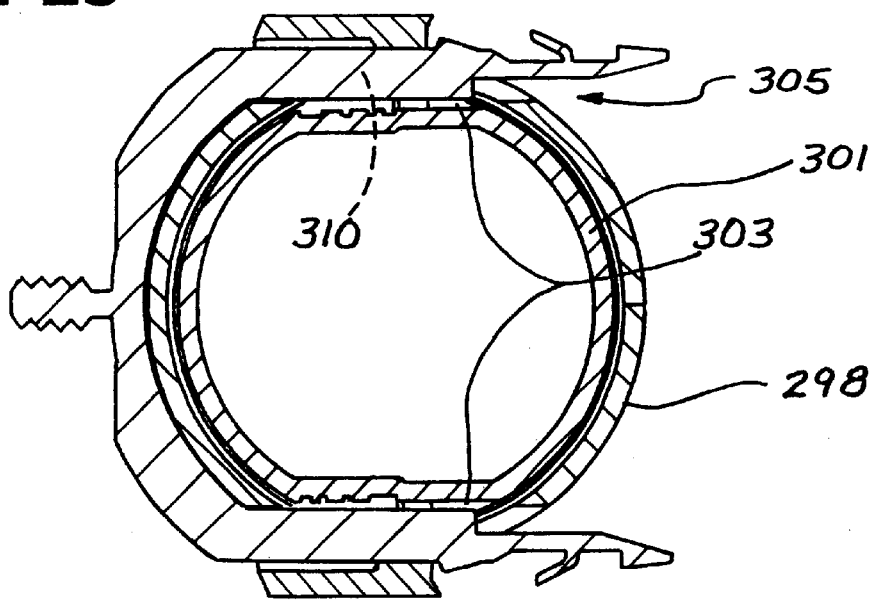
FIG. 23 is a radial cross-section view showing the clip and in an adjustable orientation and a locked state.

The clip 307 and associated window 305 in the bottom tube 298 were discussed with reference to FIG. 17 along with a procedure for adjusting the overflow tube 76*b*. A specific embodiment of this coupling structure is best illustrated in FIGS. 22–25. FIG. 23 is a radial cross-section view taken along the lines 23—23 of FIG. 18. FIG. 22 is a disassembled view of this combination. In the disassembled view, the telescoping relationship of the bottom tube 298 and top tube 301 are illustrated. The window 305 and the bottom tube 298 are illustrated to provide access to the ridges 303 of the top tube 301.

The clip 307 of this radial cross-section view is illustrated to have a U-shaped configuration with a pair of legs 352 and 354 extending from a closed end 356 of the clip 307. A handle 357 can be molded to the closed end 356 of the clip 307. A pair of ears 358 and 360 are molded to extend outwardly of, and in a bending relationship with, their respective legs 352 and 354. The legs 352 and 354 of the clip 307 can be inserted into associated channels 361 and 363 from either side of the overflow tube 76. For example, the clip 307 can be inserted into the channels 361, 363 from the left side as illustrated in FIG. 23, or from the right side as illustrated in FIG. 25.

The channels 361 and 363 can have similar structures. For example, the channel 361 can be formed in the bottom tube 298 by an outer member 365 having a concave surface 367 on one side and an opposing convex surface 369 on the other side. When the clip 307 is initially inserted into the channels 361 and 363, the ear 356 is bent against the associated leg 352 as it passes through the channel 361. When the closed end 356 abuts the overflow tube 76, as illustrated in FIG. 23, the tooth 310 engages the ridges 303 to lock the upper tube 301 relative to the bottom tube 298. With this locked relationship, the overflow tube 76 has a fixed height.

Figure 24:
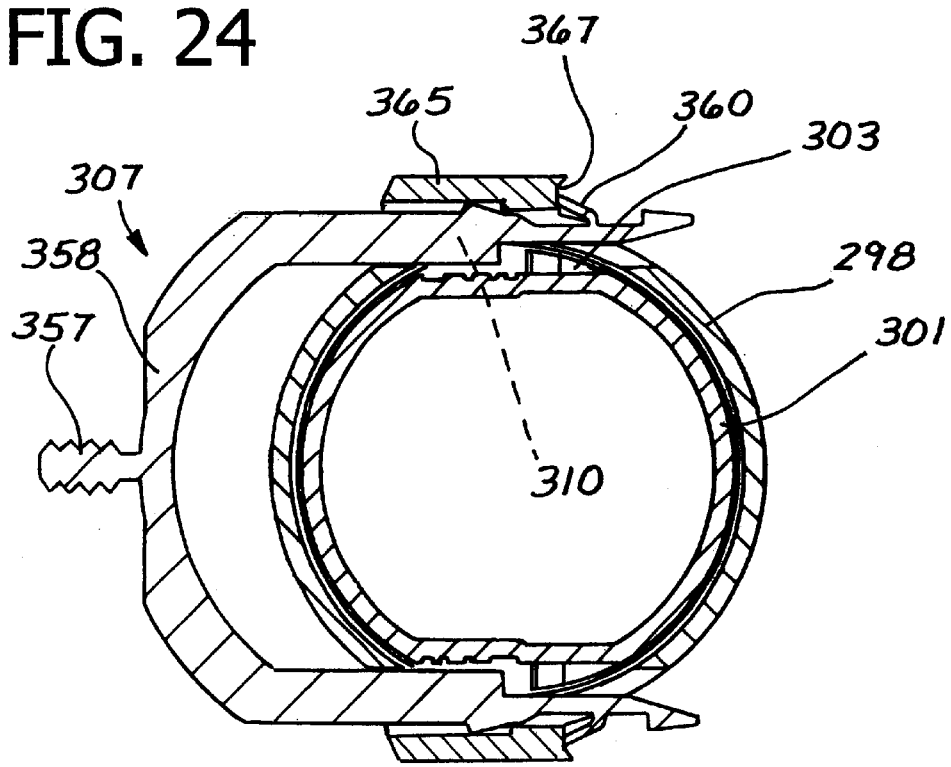
FIG. 24 is a radial cross-section view showing the clip in an adjustable orientation in an unlocked state.

If it is desired to further adjust the height of the overflow tube 76, the handle 357 at the closed end 356 of the clip 307 can be moved outwardly, to the left in FIG. 24. This outward movement continues until the ear 360 engages the concave surface 367 of the housing 365. In this position, the tooth 310 of the clip 307 disengages the ridges 303 to again permit the telescoping movement of the top tube 301 relative to the bottom tube 298.

Figure 25:
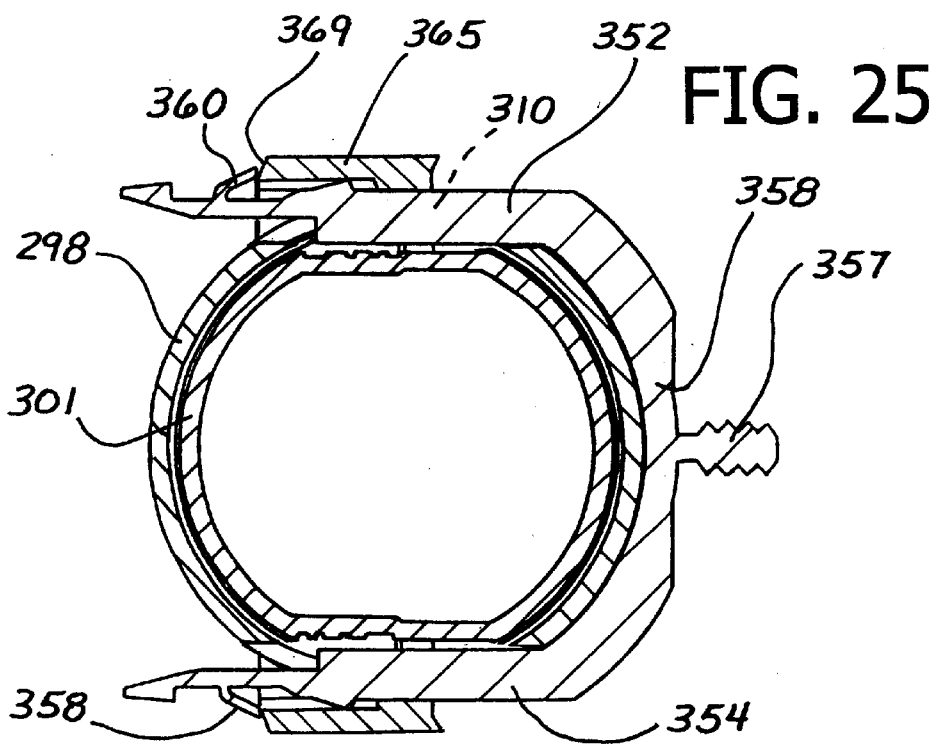
FIG. 25 is a radial cross-section view of the clip in a nonadjustable orientation in a locked state.

With reference to FIG. 25, it can be seen that the clip 307 can be inverted and inserted into the channels 361 and 363 from the opposite side, the right side in FIG. 25. From this side, the clip 307 and tooth 310 function differently with respect to the ridges 303. When the closed end 358 of the clip 307 is brought against the opposite side of the tube 298, (the right side in FIG. 25), the tube 310 engages the flanges 303 to inhibit any further height adjustment of the overflow tube 76. In this position, the ears 360 engage the convex surface 369 of the housing 365 which tends to oppose any removal of the clip from this locked state. In order to provide an indication that the clip 307 has been removed, it will be noted that the ears 360 and 361 will both flip in the opposite direction (to the left in FIG. 25) as the clip 307 is withdrawn from the channels 361 and 363 (to the right in FIG. 25). Thus, the ears 358 and 360 can provide an indication of tampering with this height adjustment.

Figure 26:
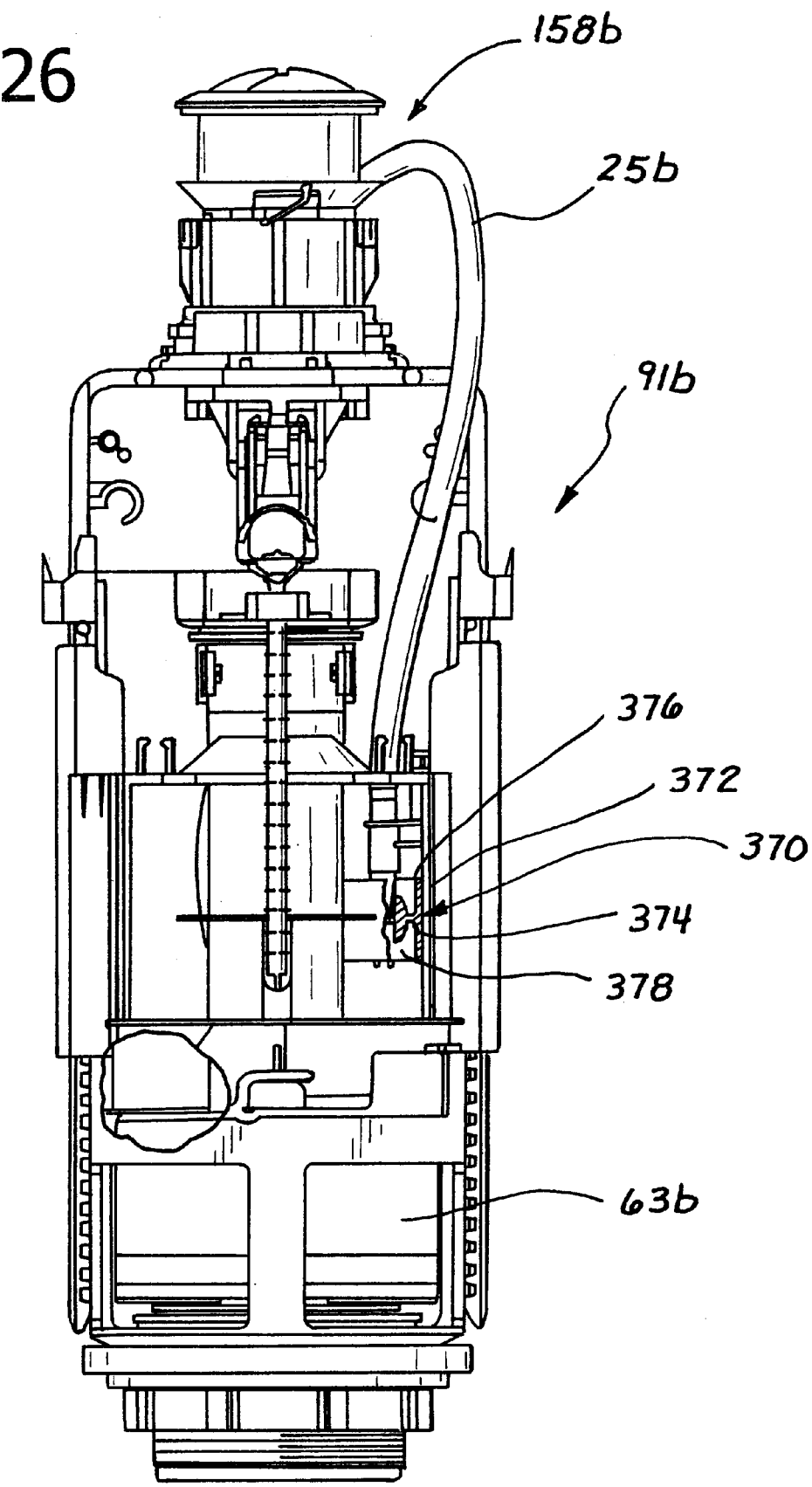
FIG. 26 is a side elevation view taken along lines 26—26 of FIG. 14.

As illustrated in the side elevation view of FIG. 26, the pressure tube 25b is coupled at one end to the hole 158b (FIG. 19) and at the other end to a positive float valve 370. This valve 370, is adjustable in height relative to the support structure 91b. The float valve 370 in this embodiment includes an outer cylinder 372 and a wall 374 which divides the cylinder 372 into an upwardly-opened water chamber 376 and a downwardly-opened air chamber 378. When the float valve 370 is in an upper position, the pressure tube 25b is closed. However, when the float valve 370 is in a lower position, the pressure tube 25b is opened to bleed air from the float 63b in the manner previously discussed.

The float valve 370 moves from the upper, closed position to the lower, open position as the surface of the water in the tank 14 drops below the air chamber 378. At this point, the valve 370 no longer floats and is free to drop under the weight of the water in the water chamber 376. As water fills the tank 14, its surface passes upwardly along the float valve 370. This initially captures air in the downwardly-opened air chamber 378 and causes the valve 370 to float. When the surface of the water passes below the float valve 370, water in the water chamber 376 weighs the float valve 370 toward the bottom position.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

What is claimed is:

1. A flush apparatus adapted for installation in a toilet tank having a flush hole, a tank top, and an interior height measured between the flush hole and tank top, the apparatus comprising:

a support structure;

a flush valve carried by the support member and adapted to be mounted relative to the flush hole of the toilet tank;

a selector assembly carried by the support structure, coupled to the flush valve, and adapted to be mounted relative to the top of the tank;

the selector assembly being operable exteriorly of the tank top to alternatively select a first flush volume and a second flush volume;

the support structure having a height adjustment variable to provide the apparatus with a height equal to the vertical dimension of the tank; and the height adjustment including a support member and a tab forming a bayonet connection with the support member, the tab being movable relative to the support member between a first position wherein the tab has a spaced relationship with the support member to permit adjustment of the height of the support structure, and a second position wherein the tab has a fixed relationship with the support member to fix the height of the flush apparatus at about the interior height of the tank.

2. The flush apparatus recited in claim 1, wherein:

the support member includes a plurality of flanges each associated with a different height of the flush apparatus;

the tab includes at least one tooth for engaging one of the flanges on the support member to maintain the support member in the engaging relationship with the tab.

3. The flush apparatus recited in claim 1, wherein the tab comprises portion of a sleeve surrounding the support member.

4. The flush apparatus recited in claim 1, wherein the tab is biased to the second position.

5. The flush apparatus recited in claim 1, further comprising:

indicia disposed on the support member and providing an indication as to the height of the support member.

6. A flush apparatus adapted for installation in a toilet tank having a flush hole, a tank top, and an interior height measured between the flush hole and tank top, the apparatus comprising:

a support structure;

a flush valve carried by the support member and adapted to be mounted relative to the flush hole of the toilet tank;

a selector assembly carried by the support structure, coupled to the flush valve, and adapted to be mounted relative to the top of the tank;

the selector assembly being operable exteriorly of the tank top to alternatively select a first flush volume and a second flush volume;

the selector assembly including a radial adjustment operable independently of the height adjustment of the support structure for aligning the selector assembly relative to the top of the tank; and the support structure having a height adjustment variable to provide the apparatus with a height equal to the vertical dimension of the tank.

7. The flush apparatus recited in claim 6, wherein the support member is a first support member, the tab is a first tab, and the height adjustment, further comprises:

a second support member;

a second tab associated with the second support member and being moveable relative to the second support member between a third position wherein the tab has a spaced relationship with the second support member to permit adjustment of the height of the support structure, and a fourth position wherein the tab has a fixed relationship with the second support member to fix the height of the flush apparatus at about the interior height of the tank.

8. The flush apparatus recited in claim 7, wherein:

the first support member and the second support member are diametrically opposed;

the first tab in the first position is disposed radially inwardly of the first tab in the second position; and the second tab in the third position is disposed radially inwardly of the second tab in the fourth position.

9. The flush apparatus recited in claim 8, wherein:

the first tab is biased to the second position and the second tab is biased to the fourth position.

10. The flush apparatus recited in claim 6, further comprising:

indicia disposed on the first support member and the second support member providing an indication as to the height of the flush apparatus and facilitating a common height of the first support member relative to the first tab and second support member relative to the second tab.

11. The flush apparatus recited in claim 10, wherein the indicia is outlined by portions of the sleeve.

12. A flush valve assembly adapted for use in toilet tank having a bottom and a top separated by a particular height, comprising:

a base structure adapted for mounting relative to the bottom of the tank;

a top structure coupled to the base structure and adapted for mounting relative to the top of the tank;

a float assembly having a height and being carried between the base structure and the top structure;

first means for adjusting the distance separating the base structure and the top structure to provide the flush valve with a height generally equivalent to the particular height of the tank; and second means for adjusting the height of the float assembly in accordance with the adjustment of the first means.

13. The flush valve assembly recited in claim 12, wherein the second means comprises:

a flush valve;

a float coupled to the flush valves;

an overflow tube coupled to the float; and third means for adjusting the height of the overflow tube.

14. The flush valve assembly recited in claim 13, wherein the overflow tube comprises:

an outer tube; and an inner tube having a telescoping relationship with the outer tube.

15. The flush valve assembly recited in claim 14, wherein the third means comprises:

portions of the inner tube defining a plurality of exterior flanges;

portions of the outer tube defining a window positioned on the outer tube to expose the flanges of the inner tube within the outer tube; and a clip extending through the window of the outer tube to engage at least one of the flanges on the inner tube in order to fix the height of the overflow tube.

16. A toilet flush valve, comprising:

a shuttle having a first position associated with a first flush volume and a second position associated with a second flush volume less than the first flush volume;

portions of the shuttle defining a hole;

a button assembly operable to move the shuttle between the first position associated with the first flush volume and the second position associated with the second flush volume;

a first button included in the button assembly and operable to move a first cam surface into the hole to move the shuttle to the first position associated with the first flush volume;

a second button included in the button assembly and operable to move a second cam surface into the hole to move the shuttle to the second position associated with the second flush volume;

a deflection member included in the portions defining the hole, the deflection member being deflectable to enlarge the hole and prevent binding of the button assembly when the first button and the second button are operated to move the first cam surface and the second cam surface into the hole substantially simultaneously.

17. The toilet flush valve recited in claim 16, wherein:

the deflection member is deflectable by the second cam surface.

18. The toilet flush valve recited in claim 16, wherein the shuttle is moveable generally in a plane between the first position and the second position.

19. The toilet flush valve recited in claim 18, wherein:

the first button is operable by pushing the first button in a direction generally perpendicular to the plane of the shuttle.

20. A flush apparatus adapted for installation in a toilet tank having a flush hole, a tank top, and an interior height measured between the flush hole and tank top, the apparatus comprising:

a support structure;

a flush valve carried by the support member and adapted to be mounted relative to the flush hole of the toilet tank;

a selector assembly carried by the support structure, coupled to the flush valve, and adapted to be mounted relative to the top of the tank;

the selector assembly being operable exteriorly of the tank top to alternatively select a first flush volume and a second flush volume;

the support structure having a height adjustment variable to provide the apparatus with a height equal to the vertical dimension of the tank;

a support member;

a tab associated with the support member and being moveable relative to the support member between a first position wherein the tab has a spaced relationship with the support member to permit adjustment of the height of the support structure, and a second position wherein the tab has a fixed relationship with the support member to fix the height of the flush apparatus at about -the interior height of the tank;

a base structure including the tab;

a top structure including the support member;

a receiver included in the top structure, the receiver being radially adjustable to vary the height of the receiver relative to the support structure; and a button assembly carried by the receiver and having a height axially variable independently of the height of the receiver relative to the support member.

21. The flush apparatus recited in claim 20, wherein the button assembly further comprises:

a living hinge axially compressible relative to the receiver to vary the height of the button assembly relative to the receiver.

* * * * *